Figure 4:
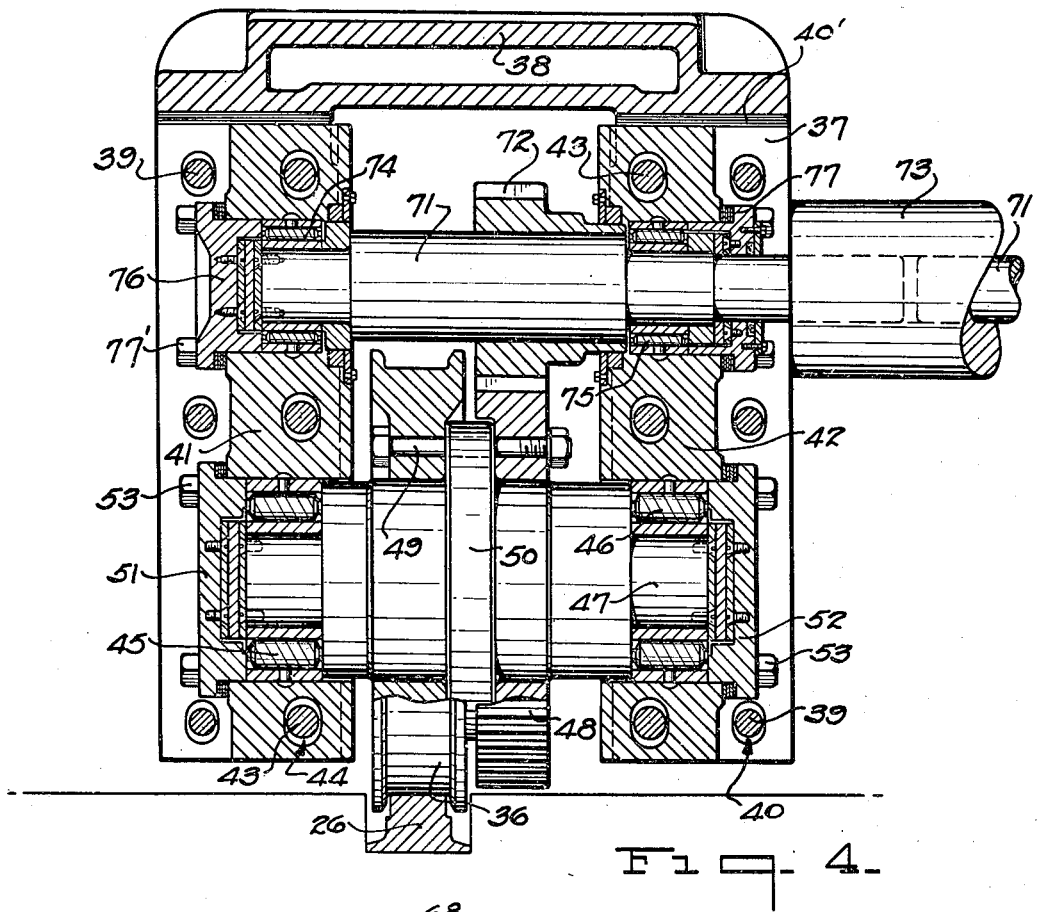

Oct. 29, 1935.  J. C. GIPE ET AL  2,019,182
TRANSFER APPARATUS
Filed April 21, 1932  14 Sheets-Sheet 1
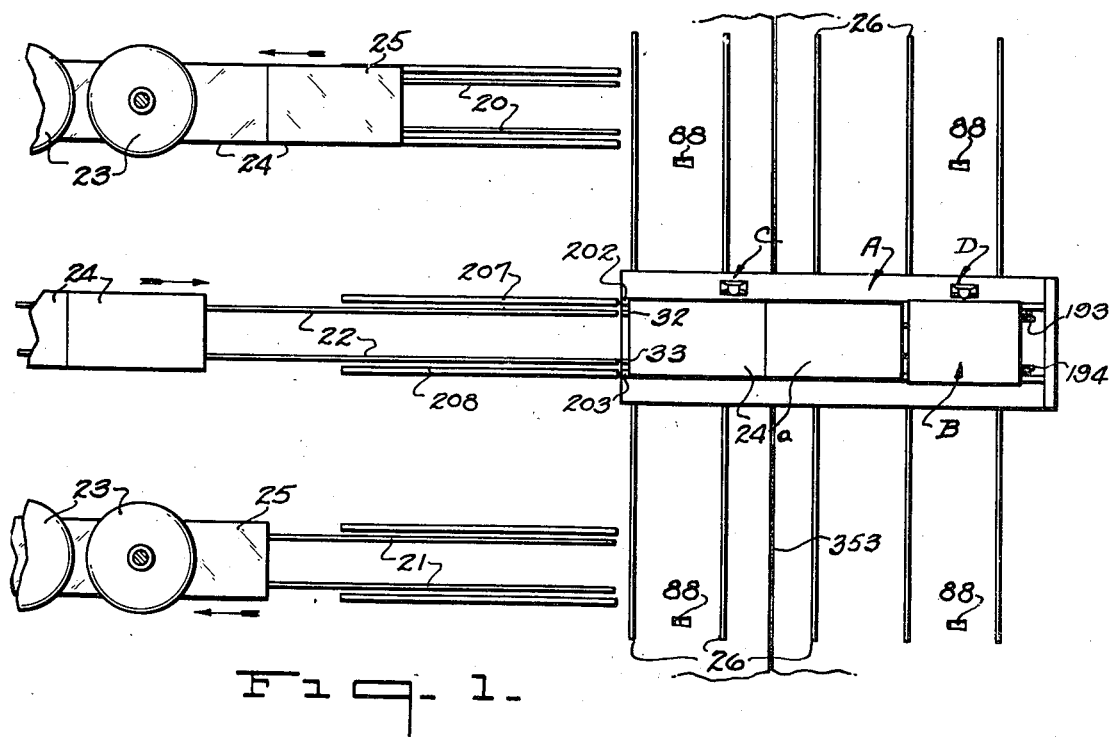
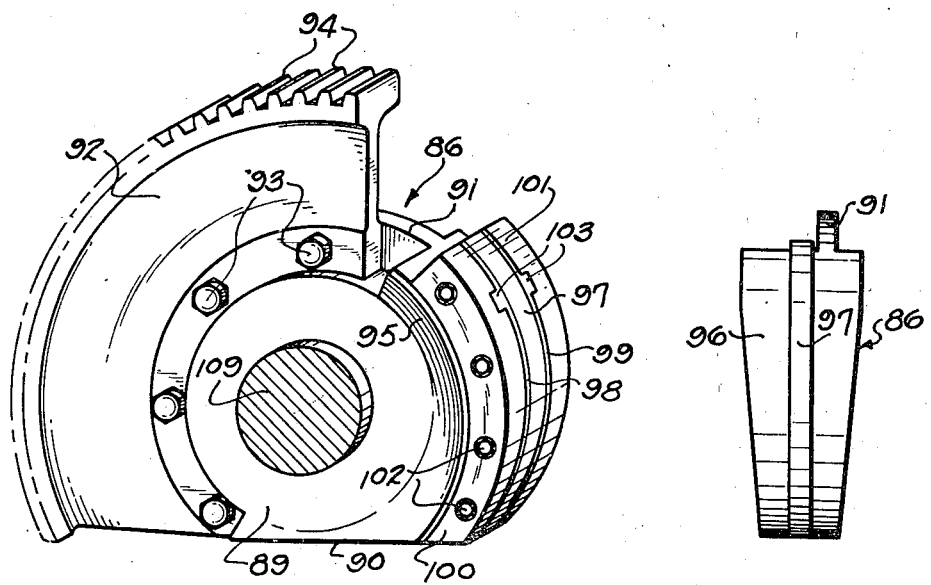
Inventor
JOHN C. GIPE
JOSEPH P. CROWLEY
By Frank Fraser
Attorney

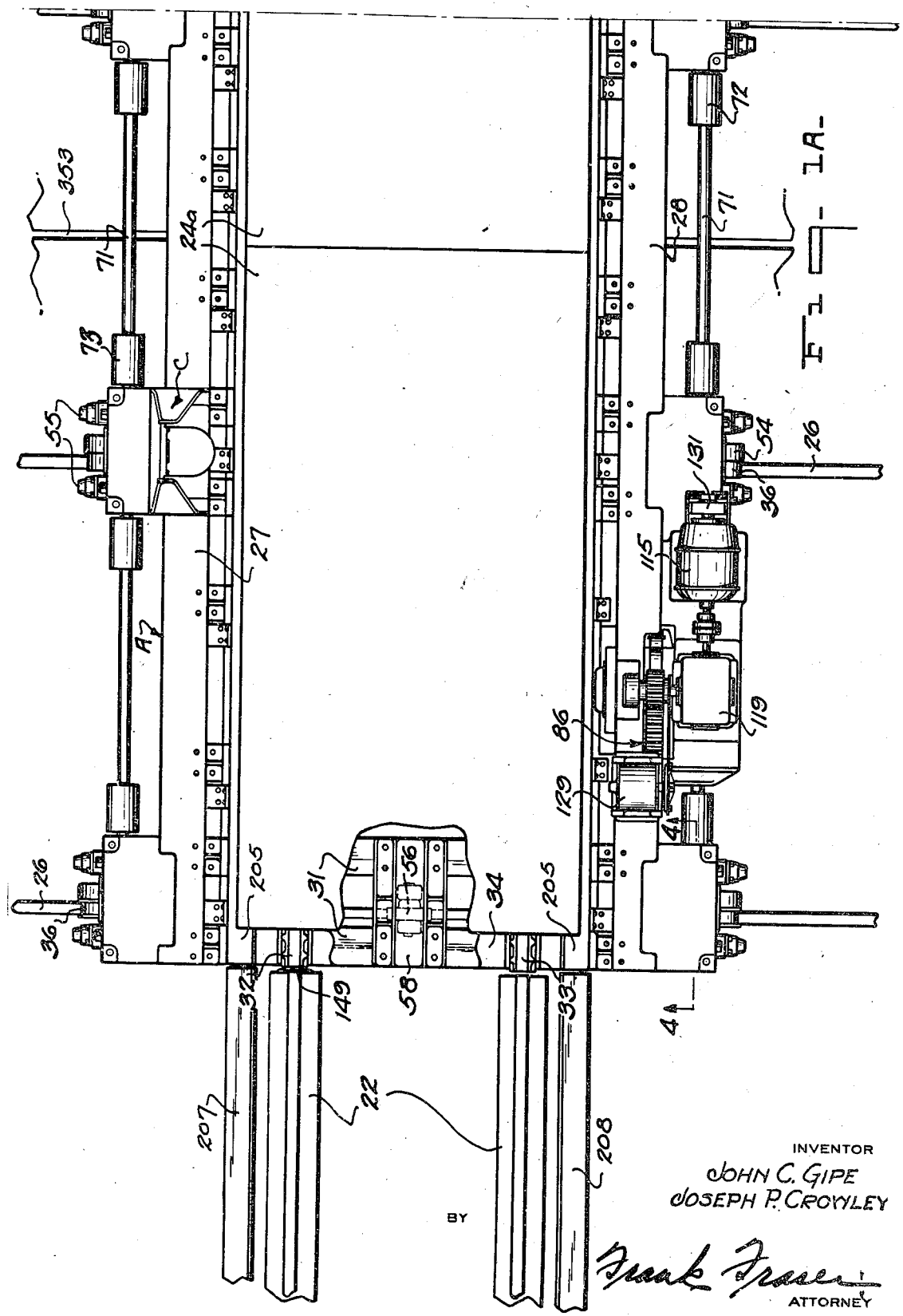

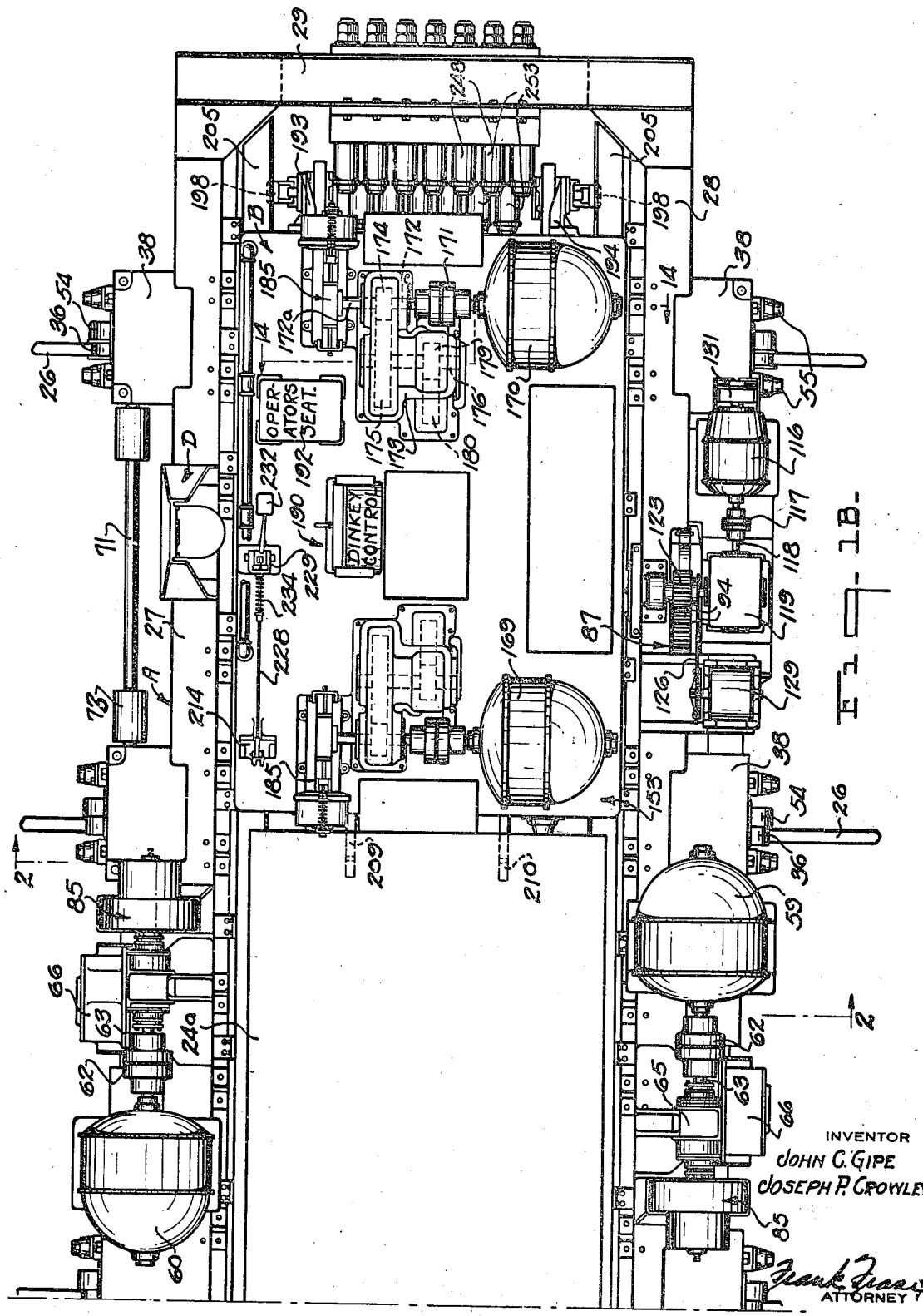

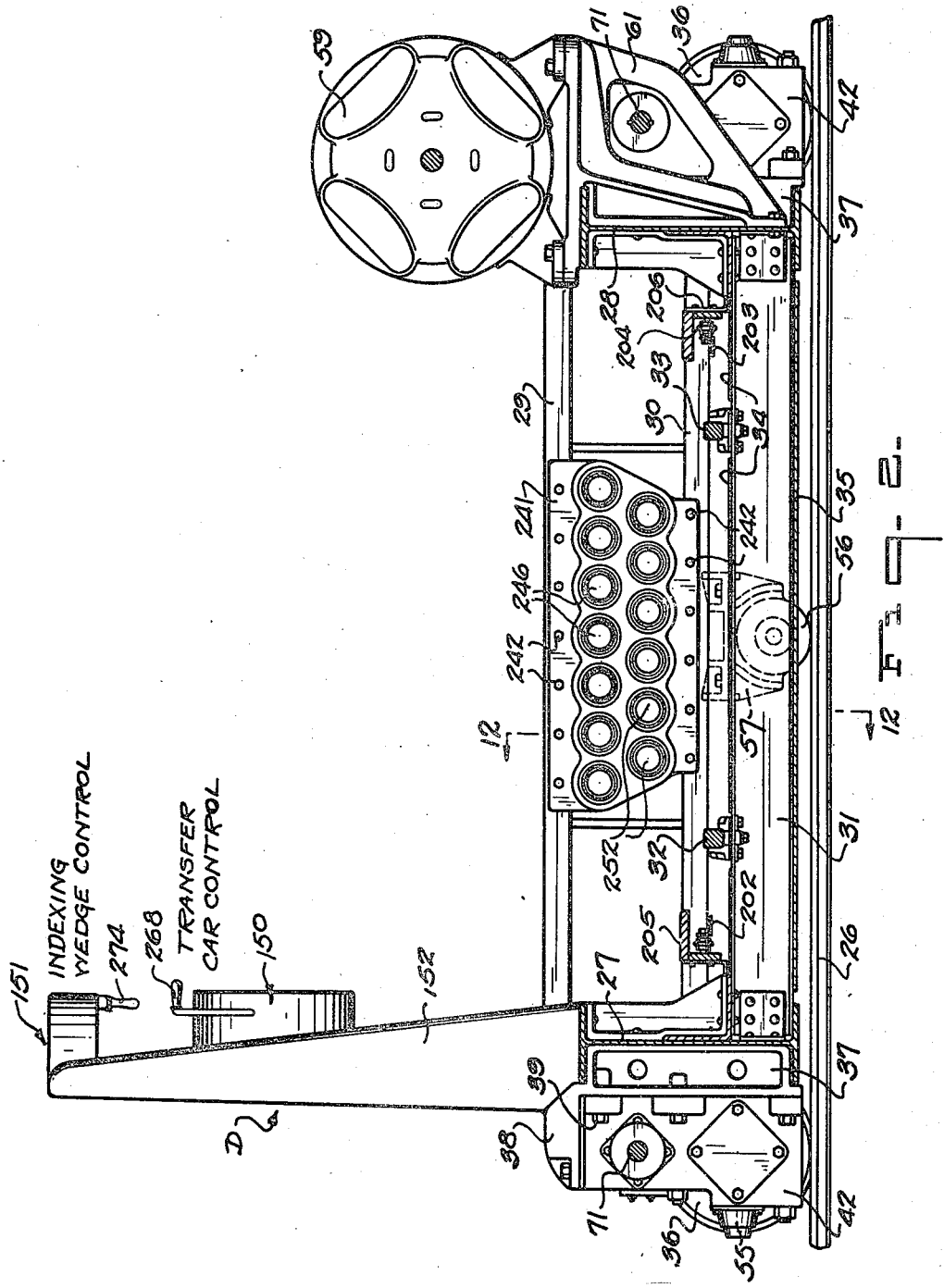

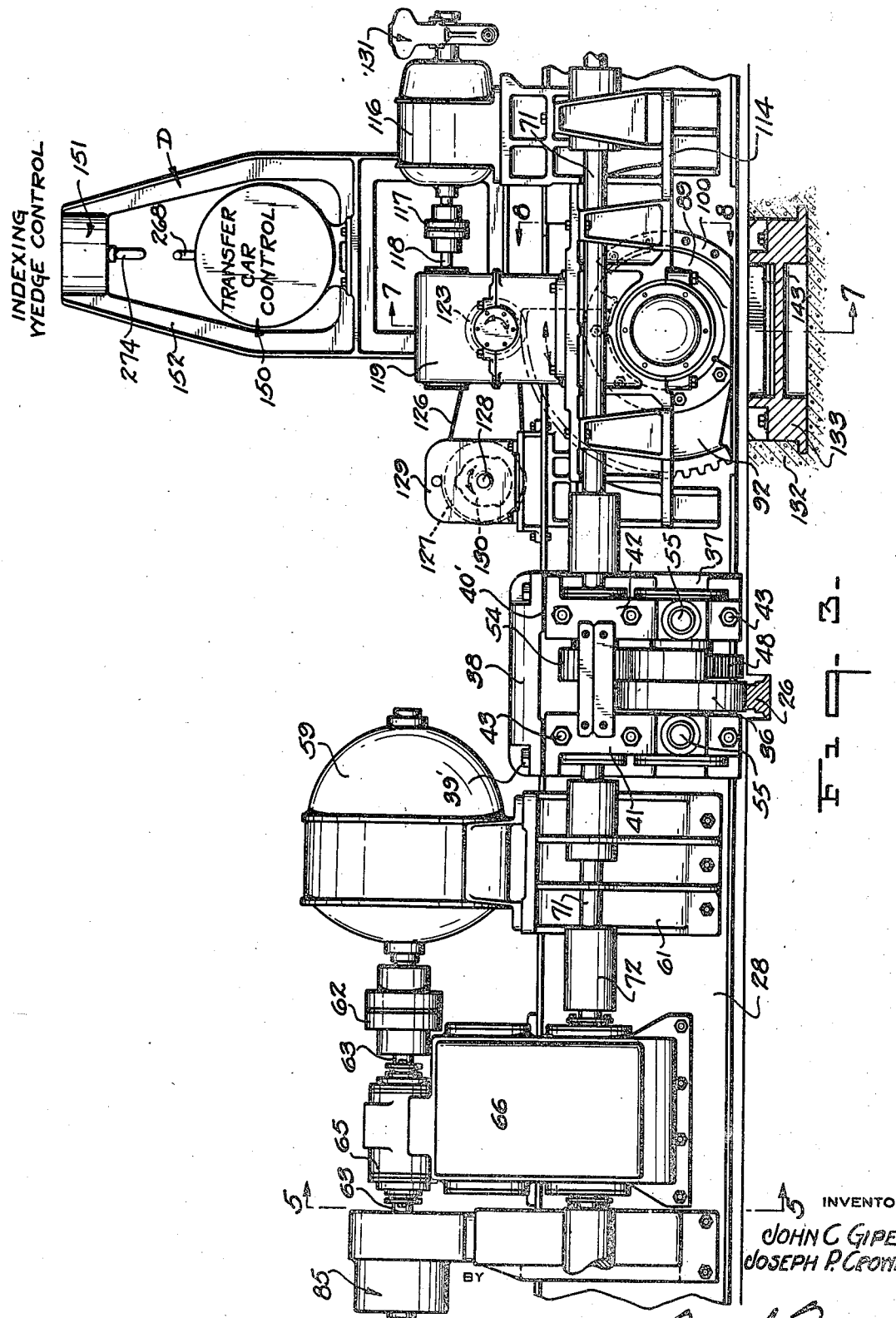

INVENTOR
JOHN C. GIPE
JOSEPH P. CROWLEY
BY Frank Fraser
ATTORNEY

Oct. 29, 1935. J. C. GIPE ET AL 2,019,182
TRANSFER APPARATUS
Filed April 21, 1932 14 Sheets-Sheet 7

Inventor
JOHN C. GIPE
JOSEPH P. CROWLEY
By Frank Fraser
Attorney

Oct. 29, 1935.   J. C. GIPE ET AL   2,019,182
TRANSFER APPARATUS
Filed April 21, 1932   14 Sheets-Sheet 8
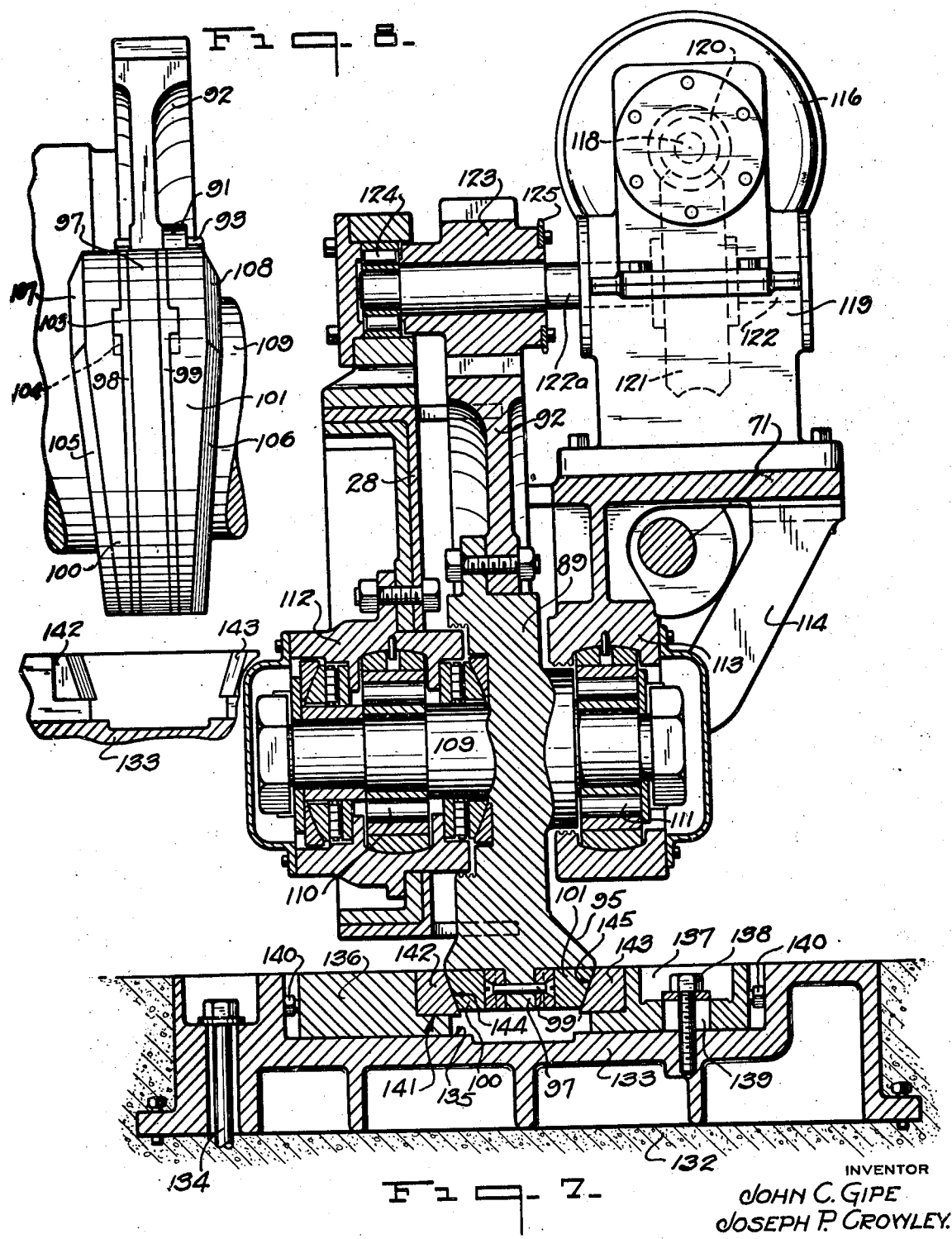
INVENTOR
JOHN C. GIPE
JOSEPH P. CROWLEY.
Frank Fraser
ATTORNEY Oct. 29, 1935.  J. C. GIPE ET AL  2,019,182
TRANSFER APPARATUS
Filed April 21, 1932  14 Sheets-Sheet 9

INVENTOR
JOHN C. GIPE
JOSEPH P. CROWLEY
BY
Frank Fraser
ATTORNEY

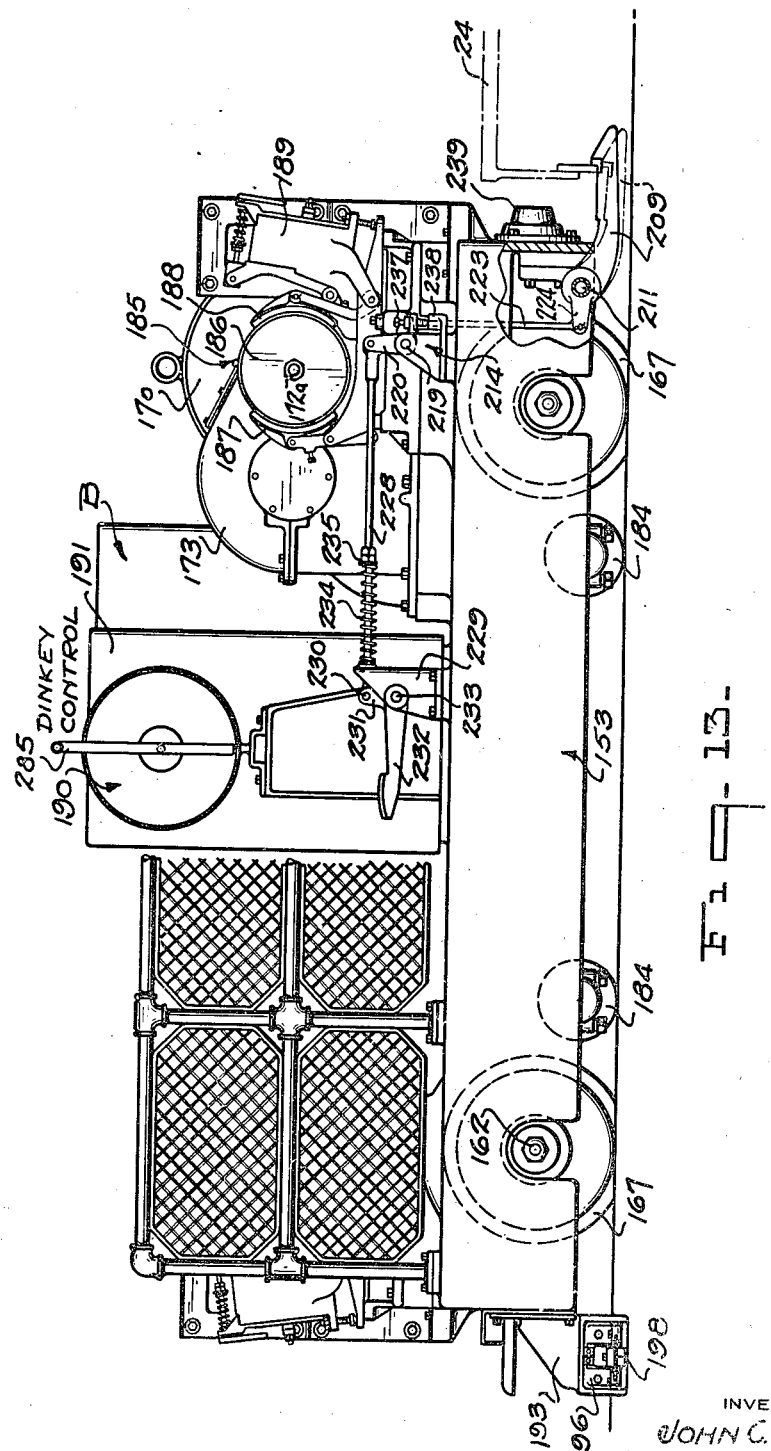

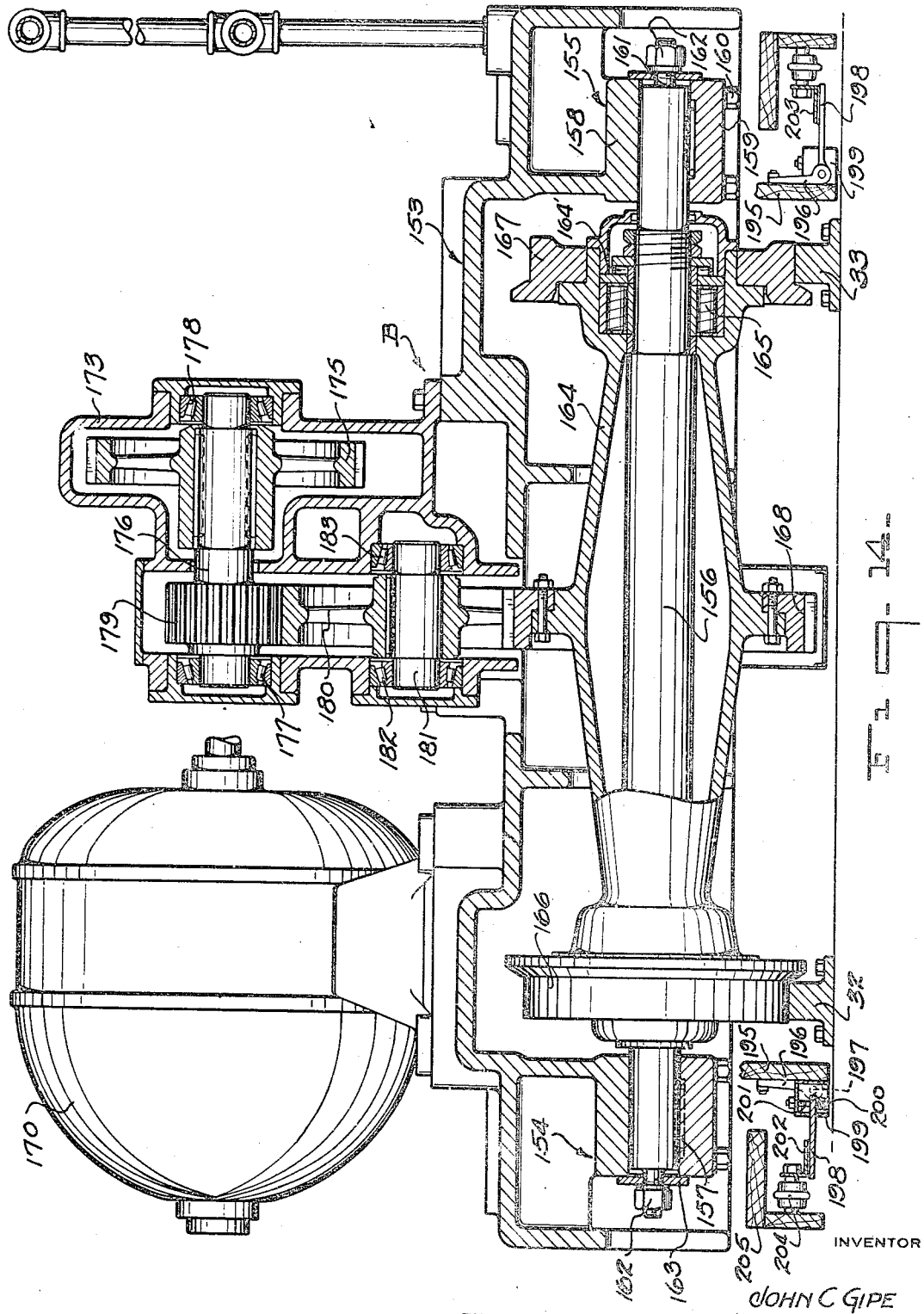

Oct. 29, 1935. J. C. GIPE ET AL 2,019,182
TRANSFER APPARATUS
Filed April 21, 1932 14 Sheets-Sheet 13
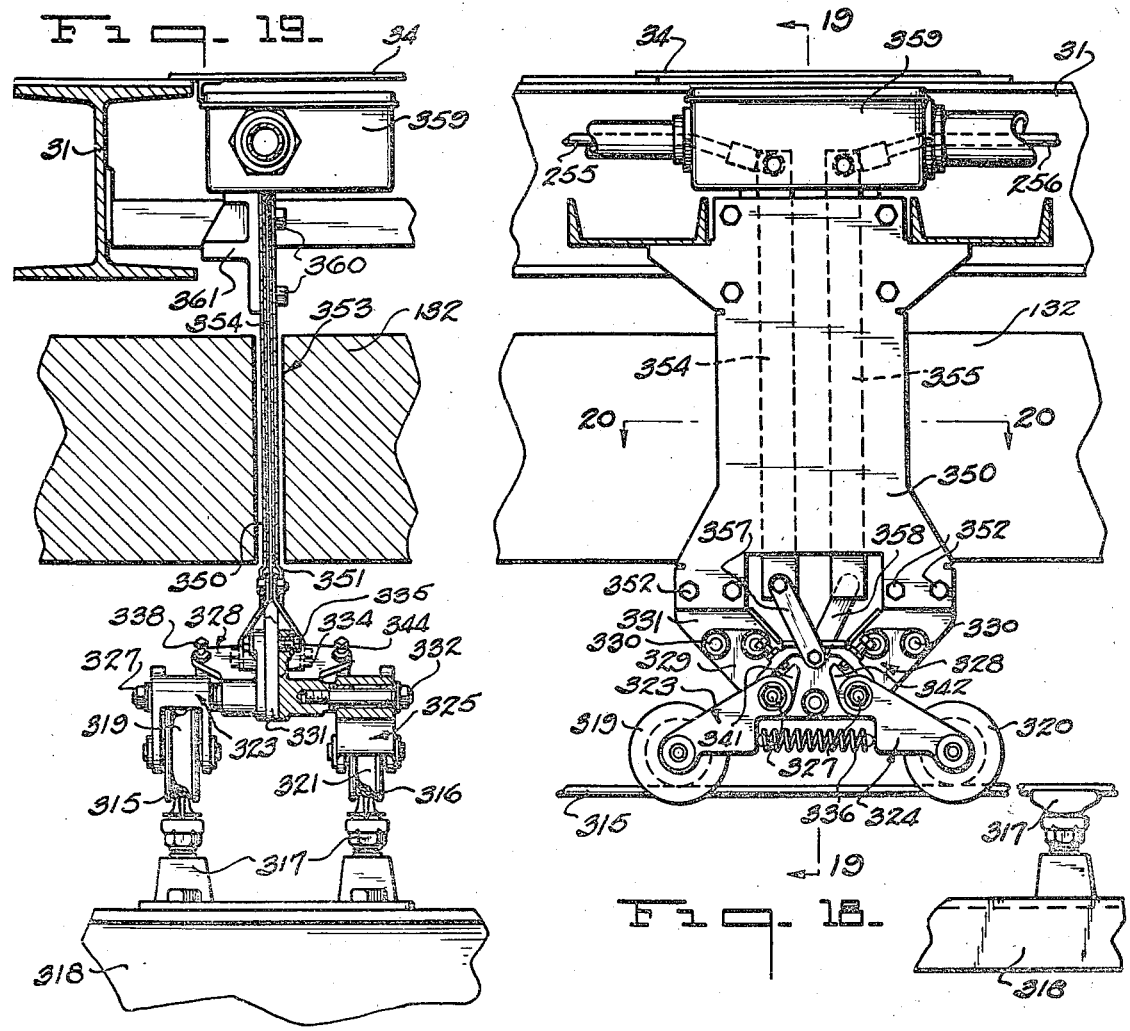
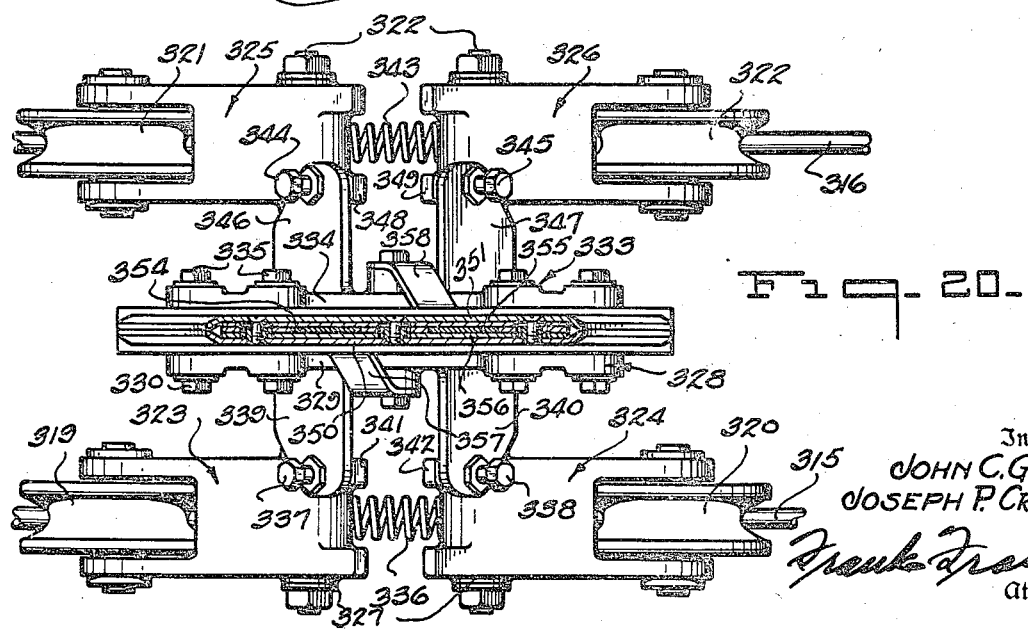
Inventor
JOHN C. GIPE
JOSEPH P. CROWLEY
Frank Fraser
Attorney

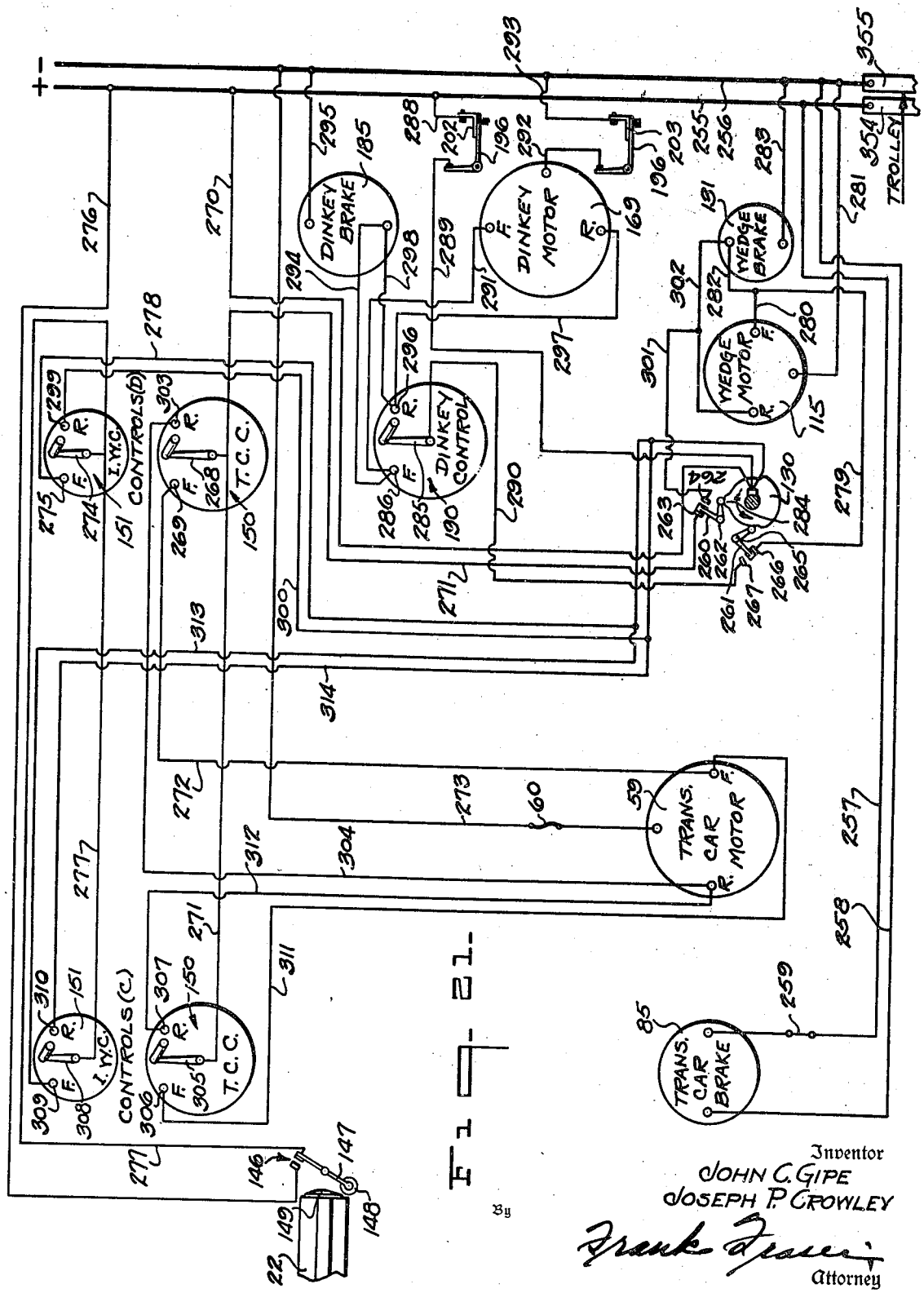

Patented Oct. 29, 1935

2,019,182

UNITED STATES PATENT OFFICE 2,019,182

TRANSFER APPARATUS

John C. Gipe and Joseph P. Crowley, Toledo, Ohio, assignors to Libbey-Owens-Ford Glass Company, Toledo, Ohio, a corporation of Ohio Application April 21, 1932, Serial No. 606,626

19 Claims. (Cl. 104—50)

The present invention appertains to the surfacing of glass sheets or other flat sheets or plates of material, and more particularly to a system wherein the grinding and polishing of the glass sheets or plates is performed in a straight-away operation, commonly termed the continuous system.

In the continuous system for surfacing sheet glass, there are provided at least two substantially parallel tracks, one constituting a working track and the other a return track. Mounted above the working track are a series of grinding and polishing units, and suitable work cars or tables are movable along this track to carry the glass sheets, secured upon the tops thereof, beneath and in engagement first with the grinding units and then with the polishing units to finish one side thereof. After the grinding and polishing operations have been completed, the glass sheets are removed from the work tables and the said tables transfered to the return track along which they are moved to the starting end of the working track.

The principal aim and object of the invention resides in the provision of improved means for handling the work cars or tables, and more especially to a novel apparatus for effecting the transfer of the work tables from the working track to the return track or vice versa. Manifestly, however, the present invention is not limited to use in connection with any particular system or to a system including any specific number of parallel tracks.

According to this invention, there is disposed at each end of the main parallel tracks a transverse track carrying a transfer car also having a track thereon upon which is mounted an operating car or dinkey employed for pulling the work tables from one of the main parallel tracks onto the transfer car and for subsequently pushing them off of the transfer car onto a second parallel track. Thus, there is provided at each end of the main parallel tracks a means for shifting the work tables upon any one of such tracks to any one of the other of said tracks.

Another important object of the invention resides in the provision of novel and improved means for positioning the transfer car with respect to the several main parallel tracks, whereby to insure a proper registration between the track on the transfer car and the desired parallel track.

A further object of the invention resides in the provision of safety means which will render the operation of certain parts of the transfer apparatus dependent upon the proper operation and positioning of other parts thereof, whereby to provide an apparatus by which the handling or transfer of the work tables may be accomplished in an effective and efficient manner with safety and ease of operation.

Still further objects of the invention are the provision of safety means for preventing the operation of the transfer car positioning means until the said transfer car has been brought to a substantially predetermined position with respect to the desired parallel track; to provide safety means for preventing movement of the transfer car along the transverse track during the operation of the positioning means or while the said positioning means is disposed in operative position; to provide means for preventing the operation of the operating car or dinkey until the positioning means has first been moved into its operative position and the track on the transfer car brought into perfect alignment with the respective parallel track; and further to provide means operable automatically, in case of power failure, for bringing the transfer car to a stop irrespective of its position upon the transverse track, and for also bringing the operating car or dinkey to a stop.

Other objects and advantages of the invention will become more apparent during the course of the following description when taken in connection with the accompanying drawings.

In the drawings forming a part of this application and wherein like numerals are employed to designate like parts throughout the same, Fig. 1 is a diagrammatic plan view illustrating one end of a grinding and polishing system and showing the transfer apparatus provided by the present invention associated therewith.

Figure 5:
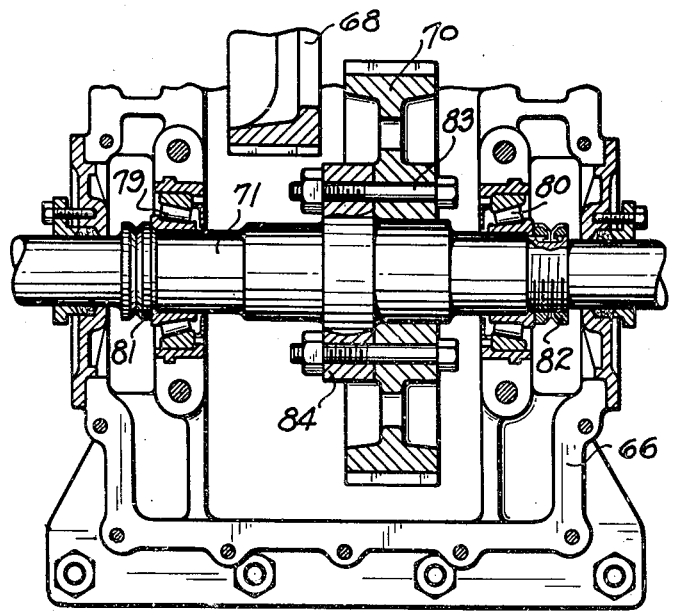
Figure 5:
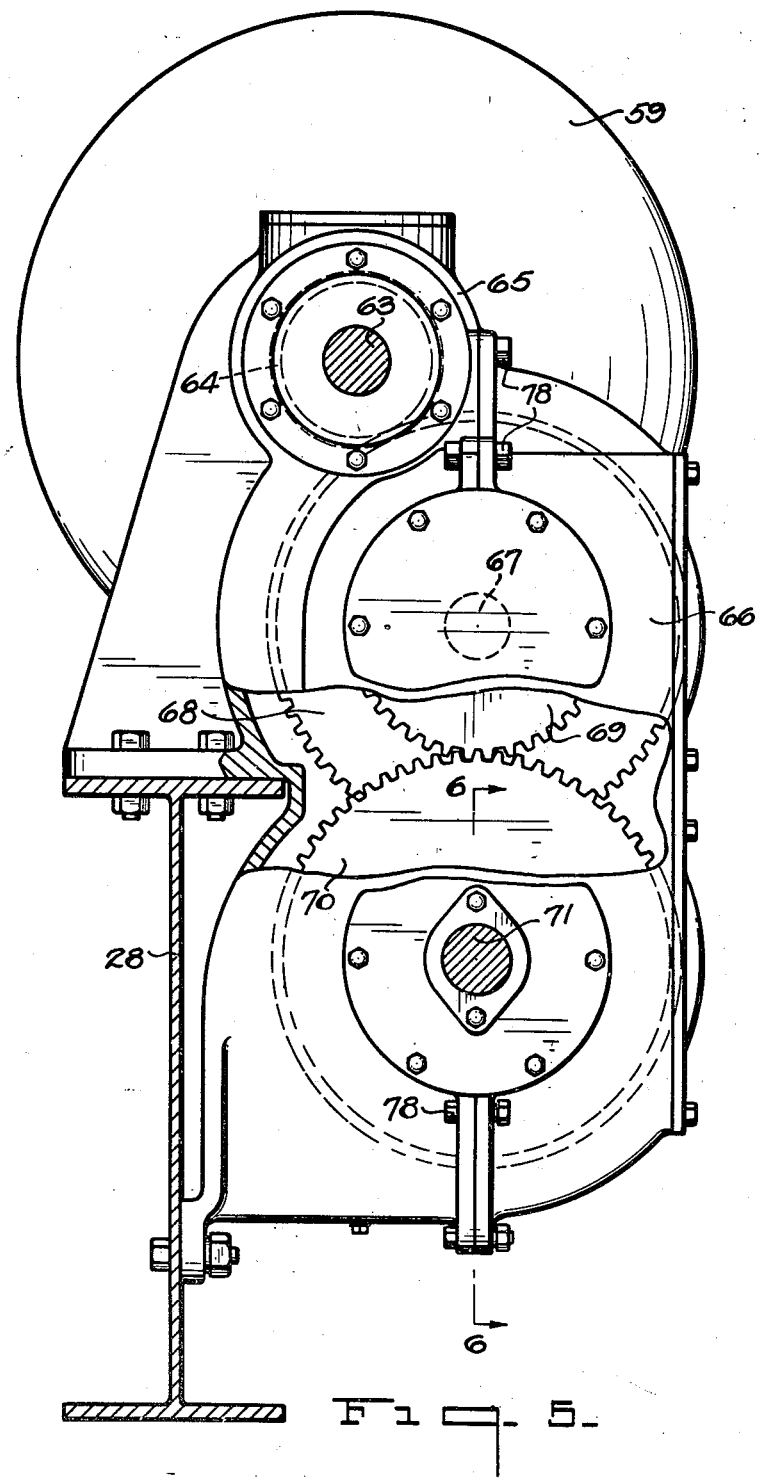
Figure 12:
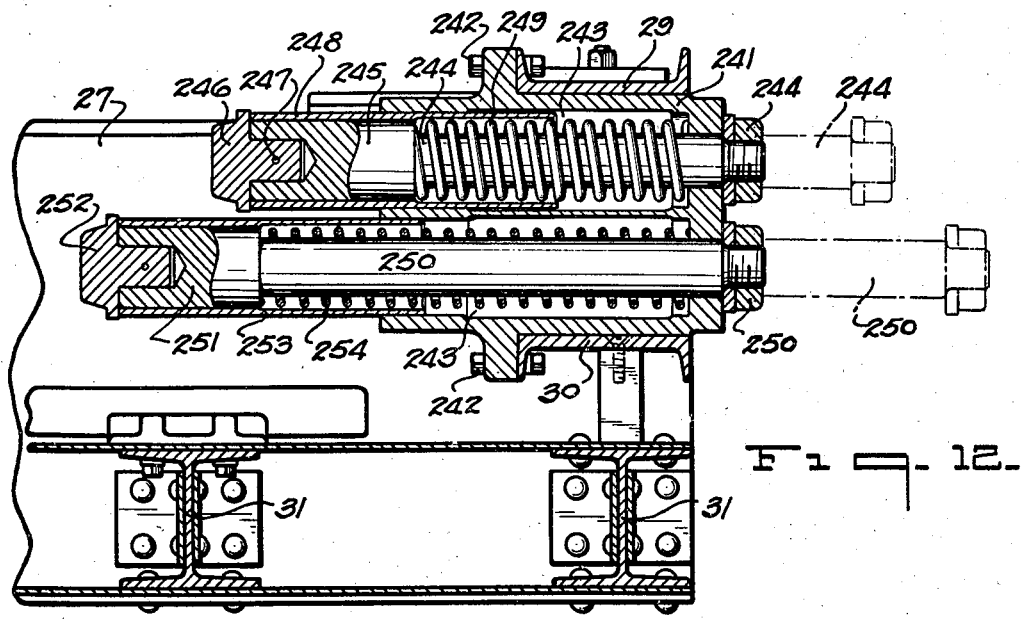
Figure 11:
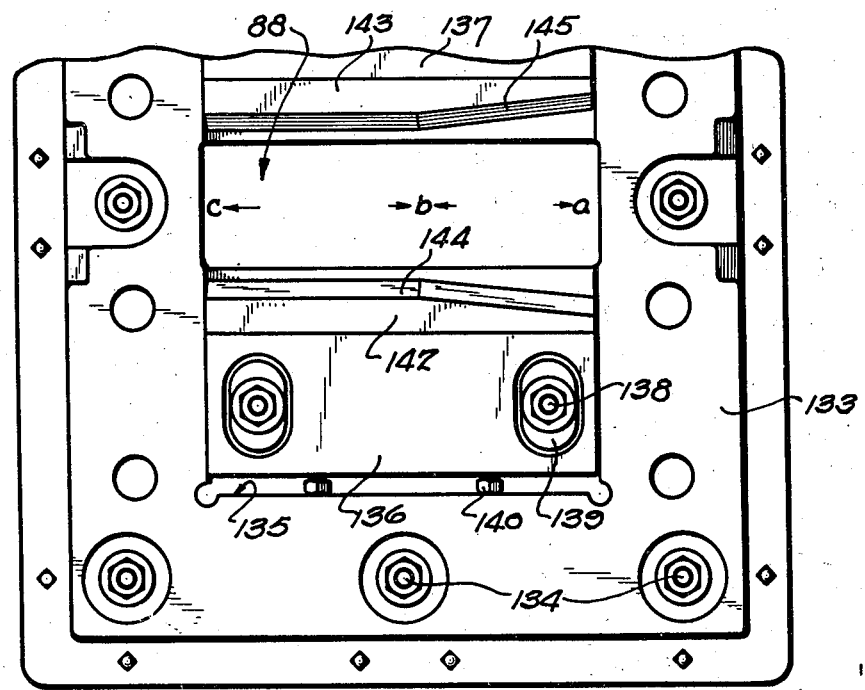
Figure 15:
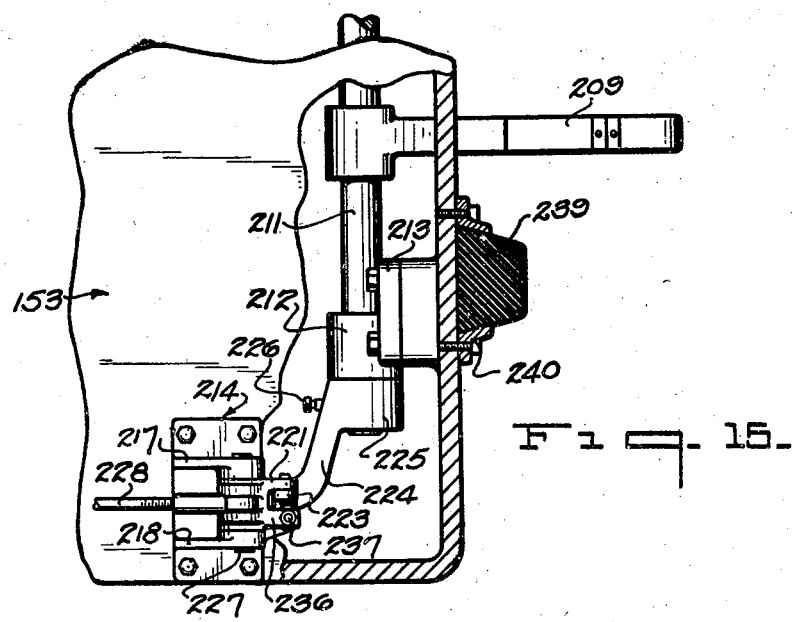
Figure 16:
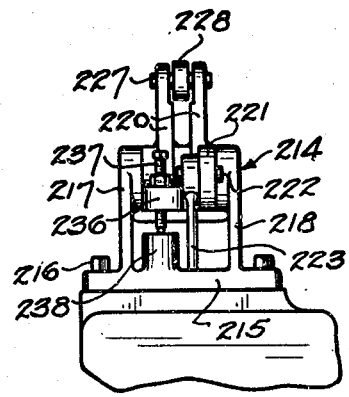
Figure 17:
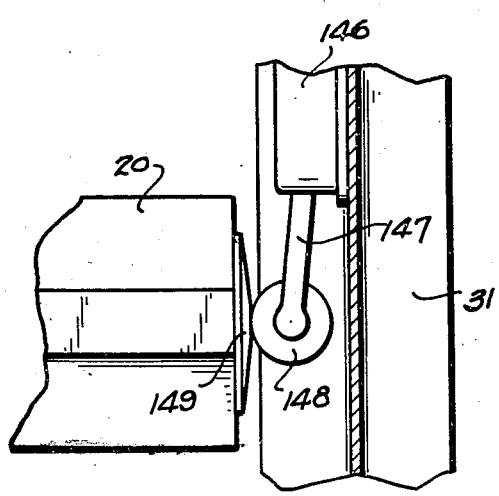

Fig. 1A is a plan view of the forward end of the transfer car,

Fig. 1B is a continuation of Fig. 1A, showing the rear end of the transfer car, with the operating car or dinkey positioned thereon, Fig. 2 is a transverse section taken substantially on line 2—2 of Fig. 1B, Fig. 3 is a side elevation of a portion of the transfer car, Fig. 4 is a detail section taken substantially on line 4—4 of Fig. 1A, Fig. 5 is a detail section taken substantially on line 5—5 of Fig. 3, Fig. 6 is a section taken substantially on line 6—6 of Fig. 5, Fig. 7 is a section taken substantially on line 7—7 of Fig. 3, Fig. 8 is a section taken substantially on line 8—8 of Fig. 3, Fig. 9 is a perspective view of the positioning or camming wedge for the transfer car, Fig. 10 is a detail view of the camming wedge with the wear strips removed, Fig. 11 is a plan view showing the recess or well for receiving the camming wedge, Fig. 12 is a section taken substantially on line 12—12 of Fig. 2, Fig. 13 is a side elevation of the operating car or dinkey, Fig. 14 is a section taken substantially on line 14—14 of Fig. 1B, Fig. 15 is a plan view, partially broken away, of a portion of the dinkey showing the coupling means, Fig. 16 is a front view of a portion of the coupling means, Fig. 17 is a plan view of a limit switch carried by the transfer car, Fig. 18 is a side elevation of the trolley for conducting the electrical energy to the transfer car, Fig. 19 is a vertical section taken substantially on line 19—19 of Fig. 18, Fig. 20 is a transverse section taken substantially on line 20—20 of Fig. 18, and Fig. 21 is a diagram of the electrical wiring for the various operating parts of the transfer car and dinkey.

Referring first to Fig. 1, there is illustrated by way of example only, a continuous system for surfacing sheet glass embodying three substantially parallel main tracks 20, 21, and 22, the two outer tracks 20 and 21 constituting working tracks, and the single central track 22 a return track. Mounted above each of the working tracks 20 and 21 are a series of grinding runners 23, and a plurality of polishing runners (not shown) but which are positioned to the left of and follow the grinding runners. Movable along the tracks 20, 21, and 22 are a plurality of work cars or tables 24, preferably carried upon wheels which roll along the said tracks. The work tables 24 are also preferably coupled together during their travel along the working tracks 20 and 21 in order to provide a substantially continuous unbroken surface upon which glass sheets 25 to be surfaced may be secured in any desired manner such as by embedding them within a layer of plaster of Paris or some other suitable material. The work tables are adapted to be propelled along the working and return tracks by any suitable type of driving means, with the said tables moving in the directions indicated by the arrows.

At each end of the main parallel tracks 20, 21 and 22 is a transverse transfer track comprising, as shown, the five spaced rails 26 extending transversely of the parallel tracks. Mounted upon the transverse track is the transfer car designated in its entirety by the letter A, said transfer car carrying the operating car or dinkey generally designated B and by means of which the work tables 24 are pulled onto the transfer car and pushed therefrom. For instance, the empty work tables 24 moving to the right along the return track 22 are adapted to be received upon the transfer car A as indicated at 24a, after which the said transfer car is moved transversely into cooperative relation with either of the working tracks 20 or 21. The empty tables 24a are then pushed from the transfer car onto the working track and, after the glass sheets to be surfaced have been placed thereupon, they are propelled forwardly along the said track beneath the grinding and polishing runners to surface one side of the glass sheets. At the opposite or left hand end of the working track, the work tables are received upon a similar transfer car and shifted back onto the return track along which they travel to the starting end of the working tracks. Of course, the table transfer apparatus can be employed in a system including either two or four main parallel tracks just as well as in a system embodying three parallel tracks.

*Construction of transfer car*

The particular construction of the transfer car A, together with the means for driving the same, is illustrated in Figs. 1A, 1B, and 2 to 6 inclusive, and special reference will now be had thereto. Thus, the transfer car includes a substantially rectangular frame comprising the spaced parallel longitudinally extending I-beams 27 and 28 which are connected together at the rear end of the car by the upper and lower cross beams 29 and 30 respectively. The I-beams 27 and 28 are also connected together at their lower ends and at a plurality of spaced points throughout their length by a series of cross beams 31. Extending longitudinally of the transfer car and supported upon the cross beams 31 is a track including the spaced parallel rails 32 and 33, said rails being of a gauge identical with the gauge of the parallel tracks and adapted to align therewith. Resting upon and secured to the cross beams 31 and covering the same are a plurality of metal plates 34 which constitute the floor of the transfer car, while also secured to the bottoms of the said cross beams are similar plates 35.

The transfer car A is preferably supported upon ten wheels 36, five wheels being arranged at one side of the car and five wheels at the opposite side so that one pair of wheels rests upon and rolls along each of the transverse rails 26. The mounting for each supporting wheel 36 comprises an inverted substantially U-shaped bracket member 37 (Figs. 2, 3, and 4) arranged outwardly of and secured to the respective I-beam 27 or 28, said bracket member being formed with an outwardly projecting top portion 38. This bracket member is secured to the respective I-beam for vertical adjustment relative thereto by means of a plurality of fastening elements 39 which extend through vertically elongated openings 40 in the side portions of the bracket member. Carried by each bracket member 37 are the spaced bearing castings 41 and 42 which are likewise mounted for vertical adjustment relative to said bracket member by means of fastening elements 43 which pass through vertically elongated openings 44 formed in the said bearing castings.

With the above construction, it will be seen that the inverted U-shaped bracket member 37 may be moved vertically relative to the respective I-beam 27 or 28, and that the bearing castings 41 and 42 can likewise be moved vertically relative to the bracket member. The bearing castings 41 and 42 can be further held in place by fastening elements 39' passing downwardly through the top portion 38 of bracket member 37, and if desired, a plurality of shims 40' may be disposed between the said top portion 38 and the upper ends of the bearing castings.

Carried by the bearing castings 41 and 42 and rotatably supported by roller bearings 45 and 46 is an axle 47 upon which the corresponding supporting wheel 36 is loosely received. Also loosely mounted upon the axle 47 is a gear 48, said gear being relatively smaller than the wheel and secured thereto by a plurality of bolts 49. Formed integral with the axle 47 and positioned between the wheel 36 and gear 48 in a manner to properly space the same is an annular flange 50 through which the said bolts 49 pass. Thus, it will be seen that upon rotation of the gear 48, the wheel 36 will be driven in unison therewith since they are tied together by the bolts 49. The roller bearings 45 and 46 supporting the opposite ends of the axle 47 may be retained in position by the end plates 51 and 52 secured to the bearing castings 41 and 42 respectively by screws 53. The gear 48 may be protected by means of a cover 54 (Fig. 3). Also carried upon the outer faces of the bearing castings 41 and 42 are suitable bumper members 55 which project outwardly beyond the wheel 36 and gear 48 and form an added protection therefor.

In addition to the wheels 36 for supporting the transfer car A, there may also be arranged at each end of the car and at a point intermediate the opposite sides thereof, an auxiliary supporting wheel 56 (Figs. 1A and 2) carried by a truck 57 suspended from a horizontal plate 58 secured to two adjacent cross beams 31. The auxiliary supporting wheels 56 are freely rotatable and are adapted to run along the two end rails 26 to further support the transfer car and prevent deflection thereof.

*Drive for transfer car*

The means for driving the supporting wheels 36 for the transfer car is best shown in Figs. 1B, 2, 3, and 5 and comprises the two reversible motors 59 and 60 operating through suitable reducing gearing and connections which will now be described in detail. These two motors are adapted to be connected in series and to operate synchronously, the motor 59 driving the wheels 36 at one side of the transfer car and the motor 60 driving the wheels at the other side. Each motor is carried by a bracket 61 secured to the respective I-beam 27 or 28 and is adapted to drive, through a suitable flexible coupling 62, a shaft 63 carrying a gear 64 (Fig. 5) arranged within the casing 65, which casing is formed at the upper end of a relatively large housing 66 also secured to the respective I-beam. Mounted within this housing is a shaft 67 to which is keyed a gear 68 meshing with and driven from the gear 64. Also carried by the shaft 67 is a second gear 69 meshing with and driving a gear 70 fixed to shaft 71, said shaft extending longitudinally of the transfer car and adapted to drive all of the wheels 36 at the corresponding side thereof. Thus, the shaft 71 passes through all of the bearing castings 41 and 42 (Fig. 4) and carries a plurality of gears 72, one being provided for and meshing with the gear 48 on the corresponding wheel axle 47 so that upon operation of the driving motor 59 or 60, the corresponding shaft 71 will be driven to effect the rotation of all of the wheels 36 at one side of the transfer car. The shafts 71 are preferably formed of a plurality of relatively short sections connected together end to end by suitable sleeve clamps 73. It is to be remembered that the two motors 59 and 60 are connected in series and operate synchronously.

As illustrated in Fig. 4, the shaft 71 is mounted within the bearing castings 41 and 42 and rotatably supported by the roller bearings 74 and 75 maintained in position by end plates 76 and 77 secured to the bearing castings by screws 77'. As best shown in Figs. 5 and 6, the gear housing 66 is preferably formed of two separate sections secured together by bolts 78. The shaft 71 is rotatably supported within housing 66 by the conical roller bearings 79 and 80 held in place by the retaining sleeves 81 and 82 respectively threaded upon said shaft. The gear 70 is fixed to shaft 71 by means of a plurality of bolts 83 which pass transversely through the gear 70 and also through an annular flange 84 formed integral with the said shaft.

*Transfer car brake*

It will be noted upon reference particularly to Figs. 1B and 3, that each shaft 63 projects beyond its respective gear case 65 and has associated with the projecting end thereof a magnetic brake supported upon the respective I-beam 27 or 28, and designated in its entirety by the numeral 85. This brake, which may be of any conventional or preferred construction, is preferably of that type wherein, during the passage of an electric current therethrough, it will be maintained in an inoperative position or out of engagement with shaft 63 to permit rotation thereof. However, when the electric current is discontinued, the brake will be automatically actuated to engage the shaft and thus prevent rotation thereof. When the shafts 63 are stopped, rotation of the shaft 71 will likewise be prevented which will thereby stop the movement of the transfer car. The brakes are interposed within the power line which supplies power to the motors 59 and 60 so that upon a failure of the power, the brakes will be automatically applied to bring the transfer car to a stop. However, the brakes are not connected in series with the motors but operate independently thereof. That is, they are always maintained inoperative except upon power failure, and then they are automatically applied. In other words, the brakes are not adapted to operate in synchronism with the motors and the motors may be turned off or on without affecting the actuation of the brakes.

*Positioning means for transfer car*

The means herein provided for positioning the transfer car in a manner to bring the rails 32 and 33 carried thereby into perfect alignment with the rails of the desired parallel track preparatory to shifting the work tables 24 from the transfer car to the parallel track or vice versa is best shown in Figs. 1, 1A, 1B, 3, and 7 to 10 and will now be described in detail.

This means includes a pair of vertically disposed rotatable wedge members designated in their entirety by the numerals 86 and 87, positioned at one side of the transfer car adjacent the forward and rear ends thereof, and which are adapted to be received within recesses or wells 88 (Fig. 1) formed in the floor of the factory or building in which the grinding and polishing system is located. During the lining up of the transfer car with the desired parallel track, the wedge members 86 and 87 move into the recesses 88 in a manner to be more fully hereinafter described, whereas during the travel of the transfer car along the transverse track, the said wedge members are removed from the recesses.

More specifically, each wedge member 86 and 87 comprises a disc 89 which is cut away to provide a straight or flat edge face 90. The disc 89 is also cut away around a portion of its periphery to provide a flange 91 to which is secured a sector gear 92 by means of bolts 93, said sector gear being formed with teeth 94. The portion of the disc substantially opposite the gear is flared outwardly or radially as at 95, with the degree of flare gradually diminishing toward the flat edge face 90 of the disc. As a result of the flaring of the disc in this manner, there is provided the peripheral surface 96 which tapers toward the flat edge face 90. Formed integral with the tapered surface 96 intermediate the opposite side edges thereof is an upstanding flange 97. Positioned at opposite sides of the flange 97 are auxiliary plates 98 and 99 secured thereto by the fastening means 99' (Fig. 7), while positioned at opposite sides of the auxiliary plates are the wear plates 100 and 101 secured to said auxiliary plates by the fastening elements 102. The auxiliary plates are preferably provided with lugs or bosses 103 which are received within corresponding recesses or notches 104 in the wear plates 100 and 101 to effect proper positioning of the latter. The wear plates 100 and 101 taper toward the lower or narrower end of the supporting surface 96 and are further provided with the bevelled edge faces 105 and 106. The wear plates are further provided adjacent their upper ends with the bevelled faces 107 and 108 which are straight and substantially parallel with one another.

The disc 89 is mounted upon a shaft 109 rotatably supported at its opposite ends by the roller bearings 110 and 111. The roller bearings 110 are mounted within a bearing housing 112 secured to the I-beam 28, while the roller bearings 111 are carried in a housing 113 formed as a part of the framework 114 also carried by the I-beam 28.

The operation of the camming wedges 86 and 87 is effected by the two reversible motors 115 and 116 respectively, these two motors being preferably connected in series with one another so that the two wedge members move synchronously into and out of operative position. Inasmuch as the actuating means for both wedges is exactly the same, a description of only one will be given. Thus, each motor 115 and 116 drives, through a suitable flexible coupling 117, a shaft 118 journaled within a housing 119 supported upon the framework 114 carried by the I-beam 28, which framework also supports the motors 115 and 116. Keyed to the shaft 118 within housing 119 is a worm 120 meshing with a worm gear 121 carried by a shaft 122. This shaft 122 is also mounted within housing 119 but extends at substantially right angles with respect to shaft 118. Moreover, the shaft 122 also projects at one end beyond housing 117 as at 122a, and has fixed thereupon a gear 123 meshing with the sector gear 92 of the respective camming wedge member 86 or 87. The projecting portion 122a of shaft 122 is supported at its outer end by the roller bearings 124.

Secured to the gear 123 (Fig. 7) is a sprocket 125, about which is trained a sprocket chain 126 (Fig 3), said chain being also trained about a sprocket 127 mounted upon a shaft 128 supported within the side walls of a housing 129 carried by the supporting framework 114. Keyed to the shaft 128 within housing 129 is a timing cam 130, the purpose and operation of which will be more fully hereinafter explained. Associated with each motor 115 and 116 is a magnetic brake designated in its entirety by the numeral 131, said brake being connected in series with its respective motor so that when the power is on and the motor operating, the brake is released, whereas when the power is shut off to stop the motor, the brake is automatically applied. For instance, during the operation of the motors 115 and 116 to cause the wedge members 86 and 87 to be moved into or out of operative position, the brakes are released or, in other words, maintained in an inoperative position, whereas when the power to the motors is discontinued or shut off, the brakes will be automatically set to prevent further movement of the wedge members.

Referring now particularly to Figs. 1, 3, 7, 8, and 11, the numeral 132 designates the concrete flooring of the factory or building in which the grinding and polishing system is located. Formed in the flooring and substantially in line with each parallel track 20, 21, and 22 is a pair of aligned recesses or wells 88 (Fig. 1) within which the camming wedges 86 and 87 are adapted to be received in a manner to bring the rails 32 and 33 on the transfer car into perfect alignment with the rails of the respective parallel track. Within each recess 88 is arranged a rectangular metallic supporting member 133 secured in place by fastening elements 134 and being also provided in the upper surface thereof with a substantially rectangular depression 135. Disposed within the depression 135 are the spaced substantially parallel, elongated plates 136 and 137, each being secured to the supporting member 133 by a plurality of screws 138 which pass through transverse slots 139 in the said plates whereby the plates may be moved toward or away from one another, as desired, this adjustment being facilitated by the provision of the set screws 140. In other words, when it is desired to adjust the plates 136 and 137 toward or away from one another, it is simply necessary to first loosen the fastening elements 138 and then rotate the set screws 140 in the proper directions.

The inner adjacent corners of the plates 136 and 137 are notched as at 141, and fitted within these notches are the wear strips 142 and 143, the inner adjacent faces of which are bevelled as at 144 and 145 to correspond to the bevelled edge faces of the wear plates 100 and 101 carried by the wedges. The wear strips 142 and 143 are shaped so that the recess 88 defined thereby is substantially V-shaped in plan as best illustrated in Fig. 11. More specifically, the recess is formed with a relatively wide forward or wedge receiving end gradually decreasing in width toward a narrower, rectangular-shaped portion wherein the wedge is finally positioned. In other words, the adjacent faces of the wear strips converge from points $a$ to $b$, whereas from $b$ to $c$ they are substantially parallel with one another. Due to the provision of a recess which is substantially V-shaped, the receiving and positioning of the wedge therein is greatly facilitated. Thus, when the shaft 109 is rotated in a clockwise direction to lower the wedge, the smaller end of the wedge will first be received within the wider end of the recess, and upon continued rotation of the wedge, it will gradually move into the narrower end. The width of the recess from points $b$ to $c$ is substantially equal to the width of the wedge between the bevelled faces 107 and 108 so that it snugly fits therein.

*General operation of transfer car and indexing means*

The general operation of the transfer car as thus far described, together with the camming wedges, may be briefly set forth as follows: As shown in Fig. 1, the transfer car A is in alignment with the return track 22 and has positioned thereupon two work tables 24a which have just been removed from the return track and are to be transferred, let us say, to the working track 20. Before starting the transfer car, the operator places the wedge motors 115 and 116 in operation to rotate the shafts 109 and likewise the wedges 86 and 87 in a counter-clockwise direction to move them out of their respective recesses 88. The operator then places the transfer car motors 59 and 60 in operation to move the transfer car along the rails 26 to a position opposite the working track 20.

When the transfer car is in substantial alignment with the working track, the movement thereof is stopped, and the wedge motors operated to move the wedges in a clockwise direction into their respective recesses 88 and, in so doing, the rails 32 and 33 on the transfer car will be brought into perfect alignment with the rails of the working track 20. The operating car or dinkey B is then placed in operation to push the tables from the transfer car onto the working track, after which the dinkey is returned to the transfer car, the wedges lifted out of the recesses, and the transfer car moved back into alignment with the return track, whereupon the operation is repeated and the next two tables transferred to the working track 21. Although both of the shafts 109 and consequently the wedges 86 and 87 have been described as turning in the same direction at the same time, if desired, the construction may be such that the wedges are moved into their respective recesses 88 by turning one of the shafts 19 with the wedge 86 in a counter-clockwise direction, and the other shaft with the wedge 87 in a clockwise direction. They are then moved out of the recesses by reversing the movement of the shafts 109.

According to the present invention, means is provided to prevent operation of the wedge members until the transfer car has been brought into substantial registry with the desired track or, in other words, until it has been stopped within a specified number of inches of the final location where the wedges are disposed above the respective recesses. This is accomplished by the provision of a switch 146 (Fig. 17) carried by the cross beam 31 at the forward end of the transfer car, said switch including a movable arm 147 carrying a roller 148 at its outer end. This switch 146 is connected in series with the wedge operating motors 115 and 116 through the timing discs 130 so that the said motors cannot be placed in operation until this switch is closed. The switch is adapted to be closed by a cam plate 149 carried by one of the rails of each parallel track. When the transfer car has been brought by the operator into substantial alignment with the parallel track, the roller 148 riding up on cam plate 149 will close switch 146 so as to permit the operation of the wedge motors. In other words, when the transfer car has been brought to a position where the switch 146 is closed, the operator knows that the wedges are located above the corresponding recesses and can be moved into operative position to cause the perfect lining up of the rails on the transfer car with the rails of the parallel track.

In order to provide for the actuation of the transfer car motors 59 and 60 and the wedge motors 114 and 116, there are employed dual sets of controls C and D, the set of controls C being positioned adjacent the forward end of the transfer car as shown in Fig. 1A, while the set of controls D is positioned adjacent the rear end thereof as shown in Fig. 1B. As illustrated in Figs. 2 and 3, each set of controls includes a control 150 for the transfer car motor and 151 for the wedge motors, these controls being mounted upon a standard 152 within convenient reach of the operator. The controls 150 of the two sets C and D are connected in series with one another and with the transfer car motors 59 and 60 so that the two motors can be operated from either control. Likewise, the controls 151 of the two sets are connected in series with one another and with the two wedge motors 115 and 116 so that the actuation of either control will place the two motors in operation. The two sets of controls C and D are provided in different locations upon the transfer car in order that convenient control of the transfer car and wedges can be secured when the dinkey B is in either of two positions. It will, of course, be understood that the handles of the controls are operated by the operator from the dinkey. For instance, when the transfer car is carrying two work tables as in Fig. 1, the dinkey is at the rear end of the transfer car and the operator will use the controls D. On the other hand, however, after the tables have been pushed from the transfer car, the dinkey need not be returned to the rear end of the transfer car but can be stopped at the forward end thereof, whereupon the operator will use the controls D.

*Construction of operating car or dinkey and drive therefor*

The operating car or dinkey B for moving the work tables from the main parallel tracks onto the transfer car and vice versa is best illustrated in Figs. 1B, 13, and 14 and comprises a substantially rectangular horizontal casting 153 constituting the body portion thereof. Carried by the underside of the casting at opposite sides thereof and adjacent each end are the opposed supporting members 154 and 155 within which are received the opposite ends of the axles 156. The upper portion or half 158 of each supporting member 154 and 155 is formed integral with the casting 153, while the lower portion or half 155 is separate, being removably secured to the upper portion by fastening elements 160. This construction is desirable since it permits of the ready removal of the axles and the parts carried thereby. The axles 156 are mounted for slidable but non-rotatable movement due to the provision of the keys 157 carried by the supporting members 154 and 155.

Each axle 156 is also provided at each end with a reduced threaded extension 161 upon which is threaded a nut 162 bearing against a plate 163, so that, upon proper adjustment of the nuts 162 at opposite ends of the axle, the said axle may be moved or adjusted longitudinally. Mounted upon each axle 156 is an axle housing 164, said housing being rotatably supported at its opposite ends by roller bearings 165, and carrying wheels 166 and 167 which are adapted to roll along upon the rails 32 and 33 of the transfer car A. From the above, it will be readily apparent that the axle housing 164 and wheels 166 and 167 rotate as a unit independently of and relative to the axle 156 which, as has been pointed out, is held against rotation. The axle housing is preferably of somewhat greater diameter at its center than at its ends, and carried by the said housing at a point intermediate its ends is a gear 168. A thrust bearing 164' may be provided at each end of the axle housing 164 to take care of the endwise thrust.

The means for driving the dinkey includes the two reversible motors 169 and 170, said motors being mounted upon the casting 153, and one being provided for and associated with each pair of wheels 166 and 167. These two motors are connected in series with one another so that they operate in synchronism at all times. Inasmuch as the drive for each set of wheels is the same, a description of only one will be given. Thus, each motor drives, through a flexible coupling 171, a horizontal shaft 172, said shaft extending through a gear case 173 and having fixed thereto a gear 174, said gear meshing with and driving a gear 175 keyed to a shaft 176 rotatably supported at its opposite ends by the roller bearings 177 and 178, (Fig. 14). Also keyed to the shaft 176 is a second gear 179 meshing with and driving a relatively larger gear 180 which in turn meshes with and drives the gear 168 carried by the respective axle housing 164. The gear 180 is fixed upon a shaft 181 supported at its opposite ends by roller bearings 182 and 183. Thus, it will be evident that upon operation of the motors 169 and 170, the axle housings 164 will be rotated upon axles 156 to effect simultaneous rotation of the supporting wheels 166 and 167 at the front and rear of the dinkey.

The dinkey may also be supported, if desired, by the relatively smaller auxiliary or pony wheels 184 carried by the casting 153, one being positioned relatively close to and preferably inwardly of each main supporting wheel. These pony wheels are idler wheels and are provided primarily to support the dinkey when the main supporting wheels close the gap between the rails 32 and 33 on the transfer car and the rails of the parallel tracks.

Each motor shaft 172 projects beyond its respective housing 173, as indicated at 172a (Fig. 1B), and associated with the projecting end thereof is a magnetic brake 185. This brake may also be of any conventional or preferred construction but is preferably of the magnetic type which is operated by the passage of an electric current therethrough. In other words, when the current is passing through the brake, the said brake is released, thereby permitting rotation of shaft 172 while, on the other hand, when the power is discontinued, the brake is automatically set in a manner to grip shaft 172 and prevent rotation thereof. This brake includes generally a brake drum 186 mounted upon the projecting end 172a of shaft 172, and positioned opposite the brake drum are the two brake shoes 187 and 188, said brake shoes being operated through suitable linkage means from the electro-magnet 189. Inasmuch as the particular construction of the brake per se constitutes no part of the present invention, the brake has not been illustrated in detail nor will it be specifically described.

As pointed out above, the two motors 169 and 170 are connected in series with one another and are adapted to be operated from a single master controller 190 which is mounted upon the upright 191 within easy reach of the operator who, during operation of the dinkey, is adapted to occupy the operator's seat indicated at 192.

The electric current is preferably supplied to the dinkey motors 169 and 170 through what is commonly known as a third-rail arrangement such as is illustrated in Figs. 1, 1B, 2, 13, and 14. Carried at the rear end of the dinkey and at opposite sides thereof are the brackets 193 and 194 to each of which is secured a plate 195 of wood or some other insulating material. Secured to this plate 195 is a metallic base plate 196 having pivotally connected thereto as at 197 a horizontal contactor rail shoe 198. A portion of this contactor shoe 198 is received within a box 199 and positioned within this box beneath the shoe is a spring 200 which operates to normally urge the shoe 198 upwardly. The contactor shoes 198 at opposite sides of the dinkey are adapted to contact with the undersurfaces of the connector rails 202 and 203, being maintained in contact therewith by the spring 200. Set screws 201 are provided to adjust the springs so as to control the pressure thereof against the rails 202 and 203. These rails extend throughout the entire length of the transfer car and are carried by a plurality of insulators 204 which are in turn carried by strips 205 of wood or some other insulating material secured by the brackets 206 (Fig. 2) to the transfer car. The electric current is adapted to pass to the dinkey motors 169 and 170 through one of the connector rails 202 or 203 and to then pass therefrom through the other connector rail. Arranged along opposite sides of each parallel track are similar connector rails 207 and 208 through which the dinkey motors derive their power when the dinkey is moved completely off of the transfer car.

*Coupling means*

The means for coupling the dinkey B to the work tables 24 in order to pull the said tables from any one of the main parallel tracks onto the transfer car A includes the two spaced hooks 209 and 210 (Fig. 1B), carried by the dinkey and adapted to pass beneath and engage the front end of the adjacent work table as shown in Fig. 13. Upon reference particularly to Figs. 13, 15, and 16, it will be seen that these two hooks 209 and 210 are fixed at their inner ends upon a rocker shaft 211 extending transversely of the dinkey at the forward end thereof and being supported at each end in a bearing 212 carried by a bracket 213 secured to casting 153.

The shaft 211 is mounted for rocking movement, and to effect such movement there is supported upon the dinkey at one side thereof and adjacent its forward end, a substantially U-shaped bracket 214 comprising a base 215 secured to the dinkey by bolts 216 and the spaced upstanding side portions 217 and 218. Positioned between and pivotally connected as at 219 to the two upstanding side portions is a bell crank lever comprising the spaced substantially vertical arms 220 and a forwardly directed ear 221 to which is pivoted as at 222 the upper end of a vertical rod 223, said rod being pivotally connected at its lower end to a curved foot 224 having formed at its outer end a bearing portion 225 receiving the adjacent end of the rocker shaft 221 therein and being secured thereto by a set screw 226.

Pivotally connected to the vertical arms 220 of the bell crank lever as at 227 is a horizontal operating rod 228, said rod passing through a stationary bracket 229 also secured to the dinkey and being pivotally connected as at 230 to an offset lug 231 carried by the foot pedal 232, said foot pedal being pivotally associated with the bracket 229 as at 233. Encircling the rod 228 is a compression spring 234 bearing at one end against the bracket 229 and at its opposite end against a nut 235 fixedly carried by the said rod. This spring, therefore, acts to normally urge the rod 228 forwardly and the vertical rod 223 downwardly. Upon downward movement of rod 223, the rocker shaft 211 will be rotated in a counter-clockwise direction to move the hooks 209 and 210 upwardly into table engaging position. When it is desired to lower the hooks out of engagement with the table, it is simply necessary for the operator to depress the foot pedal 232, whereupon the rod 229 will be drawn inwardly against the action of spring 234, this movement causing the raising of rod 223, and the rocking of shaft 211 in the opposite direction to lower the hooks.

Due to the particular shape of the forward ends of the hooks 209 and 210, when the dinkey moves forwardly to engage one of the work tables, the said hooks will be automatically cammed downwardly so that they can readily pass beneath the forward end of the said table without the necessity of the operator actuating the foot pedal 232. The foot pedal is only forced downwardly when it is desired to uncouple the dinkey from the work table.

In order to limit the upward movement of the hook members, the bell crank lever is further provided with a forwardly projecting lug 236 through which passes a set screw 237 adapted to engage a boss 238 formed on the base 215 of the bracket 214. By properly adjusting the position of the set screw 237, the degree of raising of the hook members can be controlled. As will be apparent, the hook members will only operate to pull the work tables from the parallel tracks onto the transfer car, and to facilitate the pushing of the tables from the transfer car, there is carried at the front end of the dinkey adjacent each side thereof a forwardly projecting bumper pad 239 preferably of some suitable resilient material. Each bumper pad may be removably held in place by the means 240 so that it may be easily and conveniently replaced when worn.

Bumper means on transfer car

For the purpose of bringing the dinkey B to a stop when it reaches the rear end of transfer car A with a minimum amount of jar and shock, there is provided the spring actuated bumper means illustrated in Figs. 1B, 2, and 12, said bumper means being carried by the cross beams 29 and 30 of the transfer car and including a housing 241 positioned between the said cross beams and secured thereto by the fastening elements 242. The housing 241 is formed with a plurality of cylinders 243 extending longitudinally of the transfer car and open at their forward or inner ends. These cylinders are arranged in two substantially horizontal rows positioned one above the other, with the cylinders of the upper and lower rows being preferably arranged in staggered relation with respect to one another. Received within each of the cylinders 243 of the upper row is a piston rod 244, the outer end of which projects through an opening in the rear wall of housing 241 and has threaded thereupon a nut 244'. The piston rod 244 is provided at its forward end with a piston head 245 having a recess in its outer end within which is removably fitted a bumper pad 246 of relatively hard rubber or the like, being removably secured in place by a pin 247. Encircling the piston head 245 is a relatively long bushing 248 which extends rearwardly into the cylinder. Also arranged within the cylinder and encircling the piston rod 244 is a compression spring 249 bearing at one end against the piston head 245 and at its opposite end against the rear wall of the housing. This compression spring normally tends to urge the bumper forwardly and hold it in the position indicated by the full lines in Fig. 12.

Arranged within each of the cylinders 243 of the lower row is a piston rod 250 also projecting rearwardly through an opening in the rear wall of housing 241 and having threaded upon its outer end a nut 250'. Provided at the inner end of the piston rod 250 is a piston head 251, and carried thereby is a bumper pad 252 removably secured within a recess formed in the outer end of the piston head. Encircling the piston head 251 is a relatively long bushing 253 which extends rearwardly into the cylinder, while encircling the piston rod within the said cylinder is a compression spring 254 bearing at one end against the piston head and at its opposite end against the rear wall of the housing, said compression spring functioning in the same manner as the springs 249.

It will be noted that the lower piston rods 250 are relatively longer than the upper piston rods 244 so that the lower bumpers normally project inwardly to a greater distance than the upper bumpers as indicated by the full lines in Fig. 12. In addition, it is also preferred that the compression springs 254 encircling piston rods 250 are not as strong as the compression springs 249 encircling piston rods 244. Consequently, when the dinkey moves rearwardly upon the transfer car, it will engage first the lower bumpers and then, upon continued rearward movement, the upper bumpers. The lower bumpers function to take up a certain amount of the load and will tend to slow down the dinkey, while the upper bumpers will take up the remaining portion of the load and bring the dinkey to a stop.

Electrical wiring

The operation of the different parts of the transfer mechanism will, it is believed, be more clearly and fully understood upon reference to the electrical wiring diagram shown in Fig. 21. Although the apparatus as described above includes two reversible transfer car motors 59 and 60, two reversible wedge motors 115 and 116, and two reversible dinkey motors 169 and 170, only one of each of these motors has been shown in Fig. 21 in order to simplify the wiring diagram; it being understood that the two motors of each pair are connected in series with one another so that they operate in unison at all times. The transfer car motor is designated by the numeral 59, the wedge operating motor 115, and the dinkey motor 169. Associated with the wedge motor 115 and the dinkey motor 169 are the magnetic brakes 131 and 185 respectively. As set forth above, these two brakes are of such construction that during the operation of the respective motors, the brakes will be rendered inoperative, whereas then the electric current passing to the motors is shut off, the brakes will be automatically applied.

The transfer car brake 85, on the other hand, is not connected directly with the transfer car motor 59 but is provided in order that the transfer car will be automatically brought to a stop whenever the power is accidentally or intentionally shut off. This brake is connected to the positive and negative mains 255 and 256 by the two wires 257 and 258, and interposed in the connection 257 is a switch 259. During the time this switch is closed and current is passing through the brake, the said brake will be maintained inoperative. However, should the power through the brake fail or the switch 259 be purposely opened and the power discontinued, the brake will be automatically set to bring the transfer car to a stop. The switch 259 is provided to permit the operator to break the circuit to the brake when the power is discontinued, thus preventing operation of the transfer car should the power supply be resumed without his knowledge. In the event that the power is resumed while the switch 259 is open, the brake will remain set, causing an overload of the motor 59 which will blow the fuse 69' interposed in the wire 273 of the motor circuit, and thus prevent movement of the transfer car.

The two sets of controls C and D for operating the transfer car motor 59 and the wedge motor 115 have both been illustrated since the two sets of controls operate independently of one another. Each set of controls includes the control 150 for the transfer car motor, and the control 151 for the wedge motor. The numeral 190 designates the control for the dinkey motor 169, and 130 the timing cam operated from the wedge motor 115 as disclosed above and which acts to shut off the power to the wedge motor when the wedge is moved either into its extreme operative or extreme inoperative position, and at the same time causes the setting of the brake 131.

Associated with the timing cam 130 and adapted to engage the periphery thereof are the two rocker arms 260 and 261. The arm 260 is pivoted as at 262, with the outer end thereof being positioned between the two stationary contacts 263 and 264. Likewise, the arm 261 is pivoted as at 265, and the outer end thereof is disposed between the two stationary contacts 266 and 267.

Let us assume, for the purposes of illustration, that the transfer car A is at a standstill in alignment with the return track 22 as shown in Fig. 1, and that the camming wedges 86 and 87 are in their raised or inoperative positions so that the transfer car, with the two work tables 24a thereupon, is ready to be shifted transversely along the rails 26 into a position opposite either of the working tracks 20 or 21. Inasmuch as at this time the dinkey B is at the rear end of transfer car A, the operator, from his position upon the dinkey, will actuate the set of controls D. More specifically, the operator will swing the control handle 268 of the master controller 150 to the left to engage contact 269 which will complete the circuit through the transfer car motor 59 and cause movement of the said car along the transverse rails. During such travel of the transfer car, the electric current will pass from the positive main 255 through wire 270 to the timing cam 130, and thence through contact arm 260, contact 263, wire 271, master controller 150, and wire 272 to the motor 59, and from the motor through wire 273 to the negative main 256.

When the transfer car has been brought into substantial registry with the working track 20, the operator will break the circuit through the transfer car motor 59 by swinging the control handle 268 to the right out of engagement with contact 269 and into a neutral position. The camming wedges are then actuated so that they will be lowered into their respective recesses 88 in a manner to bring the rails on the transfer car into perfect alignment with the rails of the working track as described hereinabove. In order to effect such actuation of the wedges, the operator throws the control handle 274 of the master controller 151 to the left to engage contact 275, whereupon a circuit will be completed through the wedge motor 115 to lower the wedges, and simultaneously the brake 131 will be automatically released. During the operation of the wedge motor 115, the current enters the wire 276 and passes through switch 146 (which had been previously closed upon lining up of the transfer car with the working track), and thence through wire 277, master controller 151, wire 278 to the timing cam 130, and then through contact arm 261, contact 266, wires 279 and 280 to the motor 115, and from the motor through wire 281 to the negative main. A portion of the current will also flow through wire 282 to brake 131, and from the brake out through wire 283.

During lowering of the wedges, the operation of the wedge motor also causes the rotation of the timing cam 130 in a counter-clockwise direction and, when the wedge has been moved into its extreme operative position, the timer is adapted to cause the breaking of the circuit through the wedge motor. The breaking of the circuit is effected by the engagement of the high point 284 of the timing disc 130 with the contact arm 261. This will cause the contact arm 261 to be moved away from contact 266 and thereby break the circuit at this point through the wedge motor 115 and likewise through the brake 131, whereupon the brake will be automatically set so that further movement of the wedge will be prevented.

It will be noted that the wedge motor 115 cannot be operated until the switch 146 is closed. Also that when the wedge motor is placed in operation and the timing cam 130 rotated, the circuit through the transfer car motor 59 will be broken by disengagement of contact arm 260 with contact 263 so that, even if the control handle 268 is moved into operative position, the circuit through the transfer car motor will not be completed. This, therefore, prevents movement of the transfer car during lowering of the wedges and as long as the wedges remain in operative position.

The breaking of the operating circuit for the wedge motor moves the contact arm 261 to engage contact 267 and thereby permits the completion of the operating circuit for the dinkey motor 169 upon actuation of the control handle 285 of the master controller 190. Consequently, the operation of the dinkey is prevented until the indexing wedges have been moved into operative position, at which time the high point 284 of the timing cam 130 will move the contact arm 261 into engagement with contact 267. The operator then throws the control handle 285 to the left to engage contact 286, whereby to complete the circuit through the dinkey motor 169, and also cause the release of the brake 185. The current then passes from the positive main through wire 288, connector rail 202, connector plate 196, wire 289 to timing cam 130, and from the timer through contact arm 261, contact 267, wire 290, master controller 190, and wire 291 to the motor 169, and from the motor through wire 292, connector plate 196, connector rail 203, and wire 293 to the negative main. A portion of the current will also flow through wire 294 to brake 185, and from the brake out through wire 295.

The operation of the dinkey motor will cause the dinkey to move forwardly and push the work tables from the transfer car onto the working track 20, and in order to bring the dinkey to a stop, the operator moves the control handle 285 to the right out of engagement with contact 286 and into a neutral position. The breaking of the circuit through the dinkey motor in this way will cause the automatic setting of the brake 185 to bring the dinkey to a stop. Then, when it is desired to return the dinkey to its position upon the transfer car, the control handle 285 is swung to the right to engage contact 296, whereupon the current will pass through the master controller 190, motor and brake in the same manner as described above, with the exception that the current will pass from the master controller to the motor through the wire 297 and to the brake through wire 298. This will cause a reversal of the motor 169 to return the dinkey upon the transfer car.

It will, of course, be borne in mind that the timing disc is only rotated upon operation of the wedge motor 115 and that it is not possible to operate the transfer car motor as long as the wedge is in operative position.

Upon rotation of the timing disc 130 to disengage contact arm 260 from contact 263, and effect breaking of the circuit through the transfer car motor 59, the contact arm 260 moves into engagement with contact 264 so as to permit the completion of the circuit through the wedge motor 115 upon actuation of the wedge control. Therefore, after the dinkey has been returned to its position upon the transfer car, and it is desired to raise the wedges, the operator throws the handle 274 of the master controller 151 to the right to engage contact 299, whereupon the circuit will be completed through wire 276, switch 146, wire 277, master controller 151, wire 300, to timing disc 130, contact arm 260, contact 264, and wire 301, and wire 302 which connects to both the wedge motor 115 and wedge brake 131. This will cause the brake to release and the motor to operate in a reverse direction to cause the raising of the wedges. During this operation of the wedge motor, the timing disc will be rotated in the opposite direction, and when the high point 284 thereof again engages contact arm 260, it will move the said contact arm out of engagement with contact 264 and into engagement with contact 263, thereby breaking the circuit through the wedge motor and brake and, at the same time, rendering the transfer motor circuit capable of being closed upon operation of the transfer car controller. The operator then throws the control handle 268 of master controller 150 to the right to engage contact 303 which completes the circuit through the transfer car motor 59. At this time, the current passes through wire 270, timing disc 130, wire 271, master controller 150, and wire 304 to the motor 59, and from the motor through wire 273 to the negative main, the motor being operated to return the transfer car to a position opposite the return track.

When the transfer car is in position opposite the return track, the wedges can then be lowered into operative position in the manner described above, after which the dinkey can be moved forwardly to engage two other tables, return them upon the transfer car, the wedges raised, and the transfer car moved to a position opposite the working track 21, and the work tables pushed thereupon. No special brake is connected in series with the transfer car motor, the operator causing the transfer car to slow down or come to a stop by throwing the control handle 268 of the master controller 150 into reverse, an arrangement which greatly facilitates the approximate alignment of the rails on the transfer car with the rails of the desired parallel tracks. In other words, the transfer car is stopped by what is termed plugging the motor.

After the work tables have been moved from the transfer car A onto either working track 20 or 21 and the dinkey B returned thereupon, it is not essential that the said dinkey be moved rearwardly to a position where the operator can work the set of controls D. On the other hand, the dinkey can be stopped in a position adjacent the forward end of the transfer car where the operator can work the set of controls C to effect movement of the transfer car and the operation of the wedges. The master controller 150 for the transfer car includes the control handle 305 which may be moved to engage contacts 306 or 307, while the master controller 151 for the camming wedge includes the control handle 308 movable to engage either contact 309 or 310. When the control handle 305 of master controller 150 is moved to engage contact 306, the current passes into the said controller through wire 271 and thence to the motor 59 through wire 311, while when the handle 305 is moved to engage contact 307, the current passes to the motor through wire 312. On the other hand, when the control handle 308 of the master controller 151 is moved to engage contact 309, the current enters through wire 277 and then passes through wire 313 to the timing disc, whereas when the control handle is moved to engage contact 311, the current passes through wire 314 to the timing disc. Otherwise the transfer car control and the camming wedge control circuits are the same as the circuits through the master controllers 150 and 151 of the set of controls D.

*Trolley*

The electric current is supplied to the transfer car A through the trolley arrangement illustrated in Figs. 18, 19, and 20. This trolley arrangement is mounted within a pit provided beneath the floor 132 of the building within which the transfer apparatus is installed, and which pit runs longitudinally of the transverse rails 26.

The trolley arrangement includes the spaced horizontal trolley wires 315 and 316 carried by a plurality of supporting clamps 317 mounted upon the base 318. Supported and riding along upon the trolley wires are the four trolley wheels 319, 320, 321, and 322 carried for free rotatable movement by the individual supporting trucks 323, 324, 325, and 326 respectively. The supporting trucks 323 and 324 engaging trolley wire 315 are pivoted at their inner ends as at 327 to a metal bracket member 328, the base portion 329 of which is secured by suitable fastening elements 330 to a substantially V-shaped plate 331 of some suitable insulating material. The supporting trucks 325 and 326 engaging trolley wire 316 are also pivotally mounted at their inner ends as at 332 to a bracket member 333, the base portion 334 of which is secured to the opposite side of the insulating plate 331 by suitable fastening elements 335.

Extending between and connecting the supporting trucks 323 and 324 and attached thereto is a tension spring 336 which functions to normally draw the wheels 319 and 320 inwardly toward one another so as to maintain them in engagement with trolley wire 315. The inward movement of the wheels is limited by the set screws 337 and 338 which pass through the lateral offset ears 339 and 340 of bracket member 328 and engage the lugs 341 and 342 formed on the supporting trucks 323 and 324 respectively.

The supporting trucks 325 and 326 are likewise connected together by a tension spring 343 which serves to draw the wheels 321 and 322 inwardly toward one another and into engagement with trolley wire 316. The inward movement of the wheels is limited by the setscrews 344 and 345 which pass through the lateral offset ears 346 and 347 respectively of bracket member 333 and engage the lugs 348 and 349 on the supporting trucks 325 and 326.

Secured to the upper end of the plate 331 by suitable fastening elements 352 are the opposed metal plates 350 and 351, said plates extending upwardly through the slot 353 in the floor 132. As will be readily seen in Fig. 1 the slot 353 is located between two of the transverse rails 26 and extends parallel therewith. Positioned between the plates 350 and 351 are the spaced conducting bars 354 and 355, said bars being suitably insulated from one another and also from the plates 350 and 351 by the insulation 356. The bars 354 and 355 are connected at their lower ends to the bracket members 328 and 333 by means of the connecting links 357 and 358 respectively, while the upper ends of said bars are received within the box 359, and have connected thereto the positive and negative wires 255 and 256 respectively (Figs. 18 and 21). The metal plates 350 and 351 are connected together at their upper ends by the fastening elements 360 which also serve to secure these plates to the supporting member 361 carried by the transfer car, the box 359 being also supported upon this member if desired.

The trolley has been shown diagrammatically in Fig. 21 simply to indicate its relation to the other parts of the electrical system, and upon reference thereto, it will be seen that the trolley arrangement is adapted to supply the electric current to the main lines 255 and 256 from which it is conducted to the other parts of the control system in the manner set forth in detail hereinabove.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In an apparatus for transferring cars or tables from one track to a second track, a transfer car movable between the tracks, a rotatable camming member carried by the transfer car, fixed means defining a recess for receiving the camming member therein, and means for rotating said member to move it into the recess whereby to effect the positioning of the transfer car relative to the desired track.

2. In an apparatus for transferring cars or tables from one track to a second track, a transfer car movable between the tracks, a rotatable camming member carried by the transfer car and mounted to rotate about a substantially horizontal axis first in one direction and then in the other, fixed means defining a recess for receiving the camming member therein, and means for rotating said member about its axis in one direction to move it into the recess and for rotating the same in the opposite direction to move it out of said recess.

3. In an apparatus for transferring cars or tables from one track to a second track, a transfer car movable between the tracks, a rotatable tapered camming wedge carried by the transfer car and mounted to rotate about a substantially horizontal axis, fixed means defining a recess for receiving the wedge therein, said recess being wider at one end than at its opposite end, and means for rotating the wedge to move it into the recess whereby to effect the positioning of the transfer car relative to the desired track, the narrower portion of the wedge being initially received within the wider end of the recess and the wider portion of the wedge subsequently received within the narrower end of said recess.

4. In an apparatus for transferring cars or tables from one track to a second track, a transfer car movable between the tracks, a rotatable tapered camming wedge carried by the transfer car and disposed in a substantially vertical position, means for mounting said wedge to rotate about a substantially horizontal axis, fixed means defining a recess for receiving the wedge therein, said recess being wider at one end than at its opposite end, a gear carried by the wedge, and means engaging said gear for rotating the wedge to move it into the recess whereby to effect the positioning of the transfer car relative to the desired track, the narrower portion of the wedge being initially received within the wider end of the recess and the wider portion of the wedge subsequently received within the narrower end of said recess.

5. In an apparatus for transferring cars or tables from one track to a second track, a transfer car movable between the tracks and having a track thereon, a rotatable camming member carried by the transfer car, fixed means defining a recess for receiving the camming member therein, means for rotating said member to move it into the recess whereby to effect the lining-up of the track on the transfer car with the desired first or second mentioned track, and means for preventing rotation of the said camming member until the transfer car has been brought to a substantially predetermined position.

6. In an apparatus for transferring cars or tables from one track to a second track, a transfer car movable between the tracks and having a track thereon, a rotatable camming member carried by the transfer car, fixed means defining a recess for receiving the camming member therein, a motor for rotating the camming member to move it into the recess whereby to effect lining-up of the track on the transfer car with the desired first or second mentioned track, and means for preventing the operation of said motor until the transfer car has been brought to a substantially predetermined position.

7. In an apparatus for transferring cars or tables from one track to a second track, a transfer car movable between the tracks, a movable camming member carried by the transfer car, fixed means defining a recess for receiving the camming member therein, means for moving said member into the recess whereby to effect the positioning of the transfer car relative to the desired track, and means operable automatically to stop the movement of the camming member when it reaches its operative position within said recess.

8. In an apparatus for transferring cars or tables from one track to a second track, a transfer car movable between the tracks, a rotatable camming member carried by the transfer car and mounted to rotate about a substantially horizontal axis first in one direction and then in the other, fixed means defining a recess for receiving the camming member therein, means for rotating said member about its axis in one direction to move it into the recess and for rotating the same in the opposite direction to move it out of said recess, and means operable automatically to bring the camming member to a stop when it is moved out of the recess and into its inoperative position.

9. In an apparatus for transferring cars or tables from one track to a second track, a transfer car movable between the tracks, a rotatable camming member carried by the transfer car and mounted to rotate about a substantially horizontal axis first in one direction and then in the other, fixed means defining a recess for receiving the camming member therein, means for rotating said member about its axis in one direction to move it into the recess and for rotating the same in the opposite direction to move it out of said recess, and means operable automatically for bringing the camming member to a stop when it reaches the limit of its movement in either direction.

10. In an apparatus for transferring cars or tables from one track to a second track, a transfer car movable between the tracks, a movable camming member carried by the transfer car, fixed means defining a recess for receiving the camming member therein, a motor for actuating the camming member, a circuit therefor, means operable automatically to break the circuit through the motor when the camming member reaches a predetermined position, and a magnetic brake connected in series with the motor and being automatically applied to prevent further movement of the camming member when the motor circuit is broken.

11. In an apparatus for transferring cars or tables from one track to a second track, a transfer car movable between the tracks, a rotatable camming member carried by the transfer car, fixed means defining a recess for receiving the camming member therein, means for rotating said member to move into the recess to effect the positioning of the transfer car relative to the desired track, means for driving the transfer car, and means for preventing movement of the transfer car during rotation of the camming member into operative position and while it is maintained in operative position.

12. In an apparatus for transferring cars or tables from one track to a second track, a transfer car movable between the tracks, a movable camming member carried by the transfer car, fixed means defining a recess for receiving the camming member therein, means for moving said member into the recess to effect the positioning of the transfer car relative to the desired track, a motor for driving the transfer car, a circuit therefor, and means interposed in the motor circuit for preventing the completion of said circuit during movement of the camming member into operative position and while it is maintained in operative position.

13. In an apparatus for transferring cars or tables from one track to a second track, a transfer car movable between the tracks, an operating car mounted upon the transfer car and adapted to pull the work tables onto the transfer car from one track and push them therefrom onto the second track, a rotatable camming member carried by the transfer car, fixed means defining a recess for receiving the camming member therein, means for rotating said member to move it into the recess to effect the positioning of the transfer car relative to the desired track, means for driving the operating car, and means for preventing movement of the operating car until the camming member is moved into operative position.

14. In an apparatus for transferring cars or tables from one track to a second track, a transfer car movable between the tracks, an operating car mounted upon the transfer car and adapted to pull the work tables onto the transfer car from one track and push them therefrom onto the second track, a rotatable camming member carried by the transfer car, fixed means defining a recess for receiving the camming member therein, means for rotating said member to move it into the recess to effect the positioning of the transfer car relative to the desired track, a motor for driving the operating car, a circuit therefor, and means interposed in the motor circuit for preventing the completion of said circuit until the camming member is moved into operative position.

15. In an apparatus for transferring cars or tables from one track to a second track, a transfer car movable between the tracks, an operating car mounted upon the transfer car and adapted to pull the work tables onto the transfer car from one track and push them therefrom onto the second track, a movable camming member carried by the transfer car, fixed means defining a recess for receiving the camming member therein, a motor for driving the operating car, a second motor for moving the camming member into operative position within the recess, and means operable automatically for completing the circuit through the operating car motor and for breaking the circuit through the camming motor when the camming member has been moved to its operative position.

16. In an apparatus for transferring cars or tables from one track to a second track, a transfer car movable between the tracks, an operating car mounted upon the transfer car and adapted to pull the work tables onto the transfer car from one track and push them therefrom onto the second track, a movable camming member carried by the transfer car, fixed means defining a recess for receiving the camming member therein, a motor for driving the transfer car, a second motor for actuating the camming member, and means operable automatically for completing the circuit through the transfer car motor and for breaking the circuit through the camming motor upon movement of the camming member into inoperative position.

17. In an apparatus for transferring cars or tables from one track to a second track, a transfer car movable between the tracks, an operating car mounted upon the transfer car and adapted to pull the work tables onto the transfer car from one track and push them therefrom onto the second track, a movable camming member carried by the transfer car, fixed means defining a recess for receiving the camming member therein, means for actuating said camming member, a motor for driving the operating car, a circuit therefor, means operable automatically to break the circuit through the motor upon movement of the camming member into its inoperative position, and a magnetic brake connected in series with the motor and being automatically applied to prevent further movement of the operating car when the motor circuit is broken.

18. In an apparatus for transferring cars or tables from one track to a second track, a transfer car movable between the tracks, a rotatable camming member carried by the transfer car and disposed in a substantially vertical position, means for mounting said camming member to rotate about a substantially horizontal axis, fixed means defining a recess for receiving said camming member therein, a gear carried by the camming member, and means engaging said gear for rotating the said camming member to move it into the recess whereby to effect the positioning of the transfer car relative to the desired track.

19. In an apparatus for transferring cars or tables from one track to a second track, a transfer car movable between the tracks, a rotatable camming member carried by the transfer car, fixed means defining a recess for receiving the camming member therein, means for rotating said member to move it into the recess whereby to effect the positioning of the transfer car relative to the desired track, and means for preventing rotation of the said camming member until the transfer car has been brought to a substantially predetermined position.

JOHN C. GIPE.
JOSEPH P. CROWLEY.